(12) United States Patent
Tabata et al.

(10) Patent No.: US 6,313,864 B1
(45) Date of Patent: Nov. 6, 2001

(54) IMAGE AND VOICE COMMUNICATION SYSTEM AND VIDEOPHONE TRANSFER METHOD

(75) Inventors: Seiichiro Tabata, Hino; Hiroyoshi Kobayashi; Kumi Kikuchi, both of Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/045,525

(22) Filed: Mar. 20, 1998

(30) Foreign Application Priority Data

Mar. 24, 1997 (JP) .................................................. 9-070062

(51) Int. Cl.[7] ............................. H04N 7/14; G09G 5/00
(52) U.S. Cl. ................................. 348/14.02; 348/14.05; 348/14.12; 345/8
(58) Field of Search .................................. 348/14–17, 19; 379/93.17, 93.21, 93.23, 202; 709/204; 345/158, 522, 473, 7–8

(56) References Cited

U.S. PATENT DOCUMENTS

| | | | |
|---|---|---|---|
| 5,414,457 | * | 5/1995 | Kadowaki et al. .................... 348/14 |
| 5,541,640 | * | 7/1996 | Larson ................................... 348/19 |

FOREIGN PATENT DOCUMENTS

| | | | |
|---|---|---|---|
| 4-238475 | | 8/1992 | (JP) . |
| 06141308 | * | 5/1994 | (JP) .............................. H04N/7/14 |
| 6-141308 | * | 5/1994 | (JP) .............................. H04M/1/00 |
| 7-38873 | | 2/1995 | (JP) . |
| 8-65647 | | 3/1996 | (JP) . |
| 8-123977 | | 5/1996 | (JP) . |
| 08307841 | * | 11/1996 | (JP) .............................. H04N/7/14 |

* cited by examiner

Primary Examiner—Curtis Kuntz
Assistant Examiner—George Eng
(74) Attorney, Agent, or Firm—Ostrolenk, Faber, Gerb & Soffen, LLP

(57) ABSTRACT

An image and voice communication system of the present invention has an image display element and a voice output element which are suitable for image and voice communication, and further includes a character image setting element capable of imaginatively setting a character image to be displayed on the image display element; a change command receive element for receiving from a communication mate a command signal for changing the character image; a character change element for changing the character image according to the command signal; and an element for causing the display element to display a character image changed by the character change element by supplying the changed character image to the display element.

8 Claims, 19 Drawing Sheets

CIRCLE 2 (RADIUS, COORDINATES OF CENTER, COLOR)

(POINT A, POINT B, POINT C, COLOR)

CIRCLE 1 (RADIUS, COORDINATES OF CENTER, COLOR)

CIRCLE 3 (RADIUS, COORDINATES OF CENTER, COLOR)

LINE (LENGTH, COORDINATES OF CENTER, COLOR)

CHANGE OF DATA

CHANGE OF DATA

CHANGE OF DATA

ROLL
YAW

PICTH

COORDINATE ROTATION WITH MAKING
THIS POINT AS THE CENTER OF ROTATION

IMAGE AND VOICE COMMUNICATION SYSTEM AND VIDEOPHONE TRANSFER METHOD

BACKGROUND OF THE INVENTION

1. Field of the Invention

The present invention relates to an image and voice communication system and a videophone transfer method and, in particular, to an image and voice communication system and a videophone transfer method for communicating an image such as a speaker's face or an alternate image to a communication mate and for talking with the confirming mate's face and the like when the speaker's voice is transmitted to the communication mate.

2. Description of the Related Art

Heretofore, there have been various known types of so-called videophone systems for communicating an image such as a speaker's face simultaneously with talking with the confirming mate's face and the like when speaker's voice is transmitted to the communication mate. A majority of these videophone systems use existing telephone lines, and hence, each of them simultaneously transmits pseudobidirectionally a speaker's voice data signals with image data signals such as face images.

However, it is difficult to transmit the face image data as a moving picture due to the large amount of information transmitted over an existing telephone line.

Thus, a videophone system which transmits a still picture piecemeal is adopted so as to be accommodated by a transmit path having a small transmit capacity such as a telephone line and to reduce an amount of transmitted information per unit time.

However, it is difficult to accurately transmit a moving picture in real time with this type of videophone system. Due to such difficulty, it is impossible to transmit an image of a natural countenance to a communication mate, and, consequently, a transmitted image of countenance is awkward.

In an attempt to solve this problem, a teleconference system using computer graphic (CG) technology was recently proposed, which is discussed in Japanese Unexamined Patent Publication No. 7-38873. The teleconference system proposed therein will be summarized below.

First, shape information such as concave-convex and color information of attendees' faces in a conference is acquired using a laser scanner or the like. Alternatively, the information of face images may be acquired with a digital camera or the like. A wire frame model of each attendee is then created by transforming the above-mentioned shape information into 3D polygon data.

In addition, when the conference is held, one or more markers are attached on the face of each attendee, and sensors detecting motion of the head, arm, and body are attached on respective portions of each attendee. The system detects motion of his/her face by detecting the marker attached on his/her face with a camera mounted in her/his vicinity such as a headgear mounted on the individual to follow the motion of her/his head, arm, and body with the sensors attached on his/her body portions.

Next, on the basis of motion data of the respective body portions, this system changes the wire-frame model created beforehand as described above, in real time. Further, this system completes the graphic image of an attendee corresponding to this wire-frame model by filling in the color taken in beforehand.

Thus, the system displays in real time the completed graphic image of the attendees on a screen concurrently with the attendee's motion. Consequently, it is possible for each attendee to perform discussions with recognizable countenances of the other attendees by viewing this screen display.

In using this method, a data volume varying in real time is small since image data requiring large data volume has already been taken in by the system. Hence, it becomes possible to transmit the speaker's moving picture in real time with a video system using a transmit path having a small transmit capacity such as an existing telephone line or the like.

The teleconference system proposed in the above-mentioned Japanese Unexamined Patent Publication No. 7-38873 has the drawbacks of requiring a significant amount of time and effort for attaching markers on attendees' faces and attaching sensors on their heads, arms, and bodies before the start of the conference. In addition, these drawbacks render this system inadequate for use outside a business setting, such as in ordinary homes.

The videophone system in the teleconference system requires that measurements and various data of users' face images, i.e., speakers be inputted beforehand with a scanner and the like. Hence, it is very difficult to perform this type of large-scale measurement in ordinary homes because of cost and the like. In addition, although this system requires the attachment of markers on a speaker's face before talking with a telephone, it is not practical to attach the markers on the speaker's face for every telephone call in an ordinary home when he/she is the receiver of a telephone call.

Another problem common to known videophone systems such as the one discussed above is that such systems impose a significant restriction in the mobility of the user during operation of the system by requiring that the user be positioned before a screen when talking.

SUMMARY OF THE INVENTION

An object of the present invention is to provide an image and voice communication system and a videophone transfer method for transmitting users' face motion and countenance in real time using simple and low price devices without the disadvantages presented by the prior art system discussed above.

In particular, an image and voice communication system of this invention has an image display element and a voice output element which are suitable for image and voice communication, at least in a receiving side of the communication, and comprises a character image setting element for making it possible to optionally set a character image displayed in the image display element, a change command receiving element for receiving from a communication mate a command signal to change the character image, a character changing element for changing the character image according to the command signal, and an element for providing a character image changed by the character changing element to the display element and making the display element display the changed character image.

These objects and advantages of the present invention will become further apparent from the following detailed explanation.

DETAILED DESCRIPTION OF THE PREFERRED EMBODIMENTS

Embodiments of the present invention will be described below with reference to drawings.

First, the outline of an image and voice communication system of a first embodiment according to the present invention will be described.

This image and voice communication system may be used in a videophone system for performing dialog while monitoring a face image of a communication mate via a network such as a telephone line. However, this system is characterized in that it enables a user to talk with images that are not only face images of the communication mate but also images formed from predetermined character data. Thus, the face images of the communication mate viewed by a speaker are character images created from the predetermined (assuming that optional setting is available) character data. As the speaker's face changes during the dialog, this system transmits the changed character image substantially in real time according to the motion of the main parts of the speaker's face to reflect the changes in the speaker's countenance.

The predetermined character image is set beforehand by the speaker on the sending side, and hence, when the image is transmitted, the character data of the speaker on the sending side is transmitted once to the communication mate (the receiving side). After that, only the data relating to the motion of the main portions of the character image are transmitted according to the change of the speaker on the sending side of the dialog. Thus, the transmitted data volume necessary for the image transmit is reduced to a minimum, and hence, even if the videophone system uses a network having small data transmit capacity, it becomes possible to communicate the speaker's countenance substantially in real time to the actual motion.

Although the character image may be optionally set by the user, it is also possible for the user to optionally select an image among images stored beforehand. With these capabilities, it becomes possible to conduct the dialog with a playful mind.

Furthermore, the image and voice communication system of the present invention also provides a head mounted display (hereinafter, this is called an HMD) which is used for monitoring the images by mounting it on an individual user's head as a terminal for communication transfer (see FIGS. 3 and 4).

The main parts in the image and voice communication system of the first preferred embodiment will be schematically described below with reference to FIG. 1.

Figure 1:
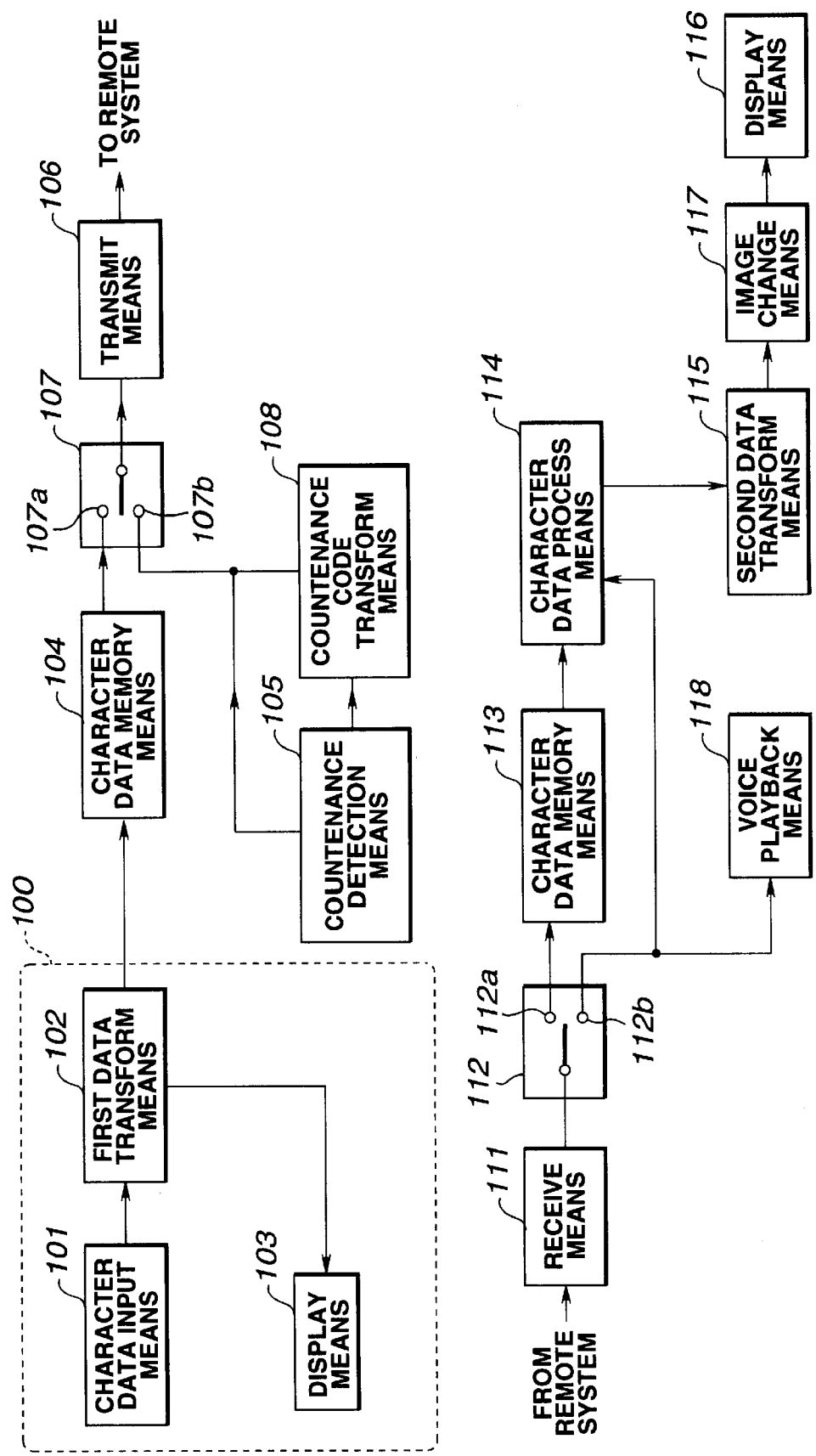
FIG. 1 is a block diagram showing the main construction of an image and voice communication device used in an image and voice communication system of a first embodiment according to the present invention.

FIG. 1 is a block diagram showing the main construction of an image and voice communication device used in the image and voice communication system of this first embodiment. In the figure, the upper side shows the main construction of the transmitting part and the lower side shows the main construction of a receiving part.

In addition, the image and voice communication system of this first embodiment performs communication with a speaker and a mate speaker using devices having similar functions. Therefore, each of the speakers performs dialog by alternately taking the positions of a speaker and a listener. However, here, for convenience' sake, it is assumed that one speaker is a speaker on a sending side and the other is a speaker on a receiving side, and that the image and voice communication devices relating to them are a device on the sending side and a device on the receiving side, respectively.

First, the construction of the transmitting part of the device on the sending side will be described.

This transmission part in the image and voice communication system of the first embodiment comprises character image creation means 100 for creating character images of the speaker on the sending side. In addition, this image and voice communication device comprises first character data memory means 104 for storing data relating to various types of character images created with this character image creation means 100. Further, this image and voice communication device also comprises countenance detection means 105 for detecting the motion of the eyes, mouth, and the like of the speaker on the sending side, for sending reference signals as described below, for detecting the motion of the eyes, mouth, and head, and voice of the speaker on the sending side, and for outputting them to the next stage at a dialog phase.

Furthermore, this image and voice communication device comprises countenance code transform means 108 for transforming the detection result (the eyes, mouth, and head motion) from this countenance detection means 105 into predetermined command codes (the eye motion code, mouth motion code, and head motion code) and outputting them. In addition, this image and voice communication device comprises first selection means 107 for selecting the data from the first character data memory means 104, data from the countenance detection means 105, or data from the countenance code transform means 108 at a predetermined timing, and outputting the data to the next stage.

Further, this image and voice communication device comprises data transmit means 106 for transmitting the data from the first character data memory means 104, data from the countenance detection means 105, or data from the countenance code transform means 108, which are selected by this first selection means 107, to the device on the mate's side (the device on the receiving side).

Furthermore, in regard to the first selection means 107, an output terminal of the first character data memory means 104 is connected to the data transmit means 106 if a terminal 107a is selected. On the other hand, if a terminal 107b is selected, an output terminal of the countenance detection means 105 or an output terminal of the countenance code transform means 108 is connected to the data transmit means 106. In addition, this first selection means 107 selects an image for the communication mate with software used in the image and voice communication device of the first preferred embodiment.

The character image creation means 100 comprises character data input means 101 for inputting the predetermined character image data, first transform means 102 for transforming the predetermined character data inputted by this character data input means 101 into predetermined dot data, and display means 103 for displaying the character data transformed into the dot data by this first transform means 102.

The display means 103 is a display part provided in an HMD or the like which is mounted by the user. The HMD will be described later in detail.

Since the character data input means 101 includes an operation panel or the like which will be described later, the user (the speaker on the sending side) inputs the predetermined character image data with the character data input means 101. At this time, the user also sets the data of the character images of countenance changed according to the motion of user's eyes, mouth, and the like with an initial character image data (a fundamental character image data). The number of character images corresponding to these countenance changes that is set is equal to the number of patterns corresponding to the preset command signal codes.

Although in this first embodiment the character data input means 101 is described as a unit for inputting the predetermined character data to be operated with the operation panel for the user to optionally set the character images, the input means 101 is not limited to this. For example, optional image data taken in with an electronic camera, a scanner or the like (including a photograph of user's own face) can be used as the character data.

In addition, the user (the speaker on the sending side) sets the reference values for countenance changes on the basis of the motion of the eyes and mouth of the speaker on the sending side, which is detected with the countenance detection means 105, and the character data input means 101. The reference value refers to a threshold value at the time of deciding whether a suitable command signal code is outputted to indicate the level of change in the speaker's countenance.

The countenance detection means 105 is provided in an HMD that the user mounts, and is used when the reference values of the countenance changes are generated. Further, means 105 also detects and outputs each countenance change (the eyes, mouth, and head motion) and voice signal of the speaker on the sending side at a predetermined timing.

When the reference values of the countenance changes are generated, the detected values relating to the motion of the eyes and mouth elements of the countenance changes outputted from the countenance detection means 105 are inputted to the countenance code transform means 108 with the speaker on the sending side operating the character data input means 101. On the basis of these detected values, the reference values of the countenance changes are generated. In addition, the number of these reference values is the same as the number in the preset command signal codes.

In dialog, the countenance changes such as the motion of the eyes and mouth of the speaker on the sending side which occur at the predetermined timing are transformed into the predetermined command signals serially (substantially in real time) by the next stage of countenance code transform means 108. The countenance changes are transmitted to the device on the receiving side via the data transmit means 106.

Furthermore, the head motion data is transformed into a different predetermined code not corresponding to the command signal coded by the countenance code transform means 108 and is transmitted to the device on the receiving side via the data transmit means 106.

In addition, the voice signal bypasses the countenance code transform means 108 and is transmitted to the device on the receiving side via the data transmit means 106.

The predetermined command signal codes corresponding to the motion data of the eyes and mouth, the code corresponding to the head motion data, and the voice signal are transmitted in synchronization with each other.

The above work is transformed into dot data by the first transform means 102 and is serially displayed on the display means 103, and, hence, the user can perform the above work while monitoring the work.

On the other hand, the main part of the receiving part of the image and voice communication device comprises data receiving means 111 for receiving the predetermined data sent from the data transmit means of the device on the sending side, second selection means 112 for selecting a next stage of circuit according to the type of data received by data receiving means 111; second character data memory means 113 for temporarily storing the predetermined data of the speaker's character images when second character data memory means 113 is selected by the second selection means 112; character data process means 114 for processing the speaker's character image on the basis of the predetermined data of the speaker's character images stored in the second character data memory means 113 and the countenance change data that is detected by the countenance detection means 105 in the sending side and is coded by the countenance code transform means 108; second transform means 115 for transforming the speaker's character images which are processed by this character data process means 114 into predetermined data; image change means 117 for calculating and outputting the level of an image change on the basis of the head motion data detected by the countenance detection means 105 in the sending side of the dialog; voice playback means 118 for playing back the voice signal detected by the countenance detection means 105 in the sending side of the dialog; and display means 116 for displaying the speaker's character images.

In the second selection means 112, a terminal 112a is selected in the initial phase of communication. At this time, an output terminal of the data receive means 111 is connected to the second character data memory means 113. For the dialog phase of communication, a terminal 112b is selected so that the output terminal of the data receive means 111 is connected to the character data process means 114 and the voice playback means 118 while bypassing the second character data memory means 113.

The second transform means 115, in the initial phase of communication, determines the change levels of the character images corresponding to motion of the eyes and mouth of the speaker on the sending side by comparing the command signal codes sent from the device on the sending side to the present command signal codes, and sending them to the image change means 117 after performing predetermined image processing.

In the dialog phase of the communication, the image change means 117 calculates the change level of the character image corresponding to the head motion of the speaker on the sending side with a predetermined calculation method. The means 117 performs a predetermined image processing for the data from the second transform means 115 and thereafter generates the speaker's character image substantially in real time and displays the image on display means 116.

Furthermore, since the code corresponding to the head motion data and the command signal codes corresponding to the eye and mouth motion data are transmitted in synchronization with each other, the display means 116 of the device on the receiving side also displays the image in synchronization.

Moreover, in the initial phase of communication, the voice playback means 118 plays back the voice signal of the speaker on the sending side while synchronizing the voice signal with the command codes corresponding to the eye and mouth motion data and the code corresponding to the head motion data.

Next, use of the image and voice communication system of the first embodiment discussed above will be simply described.

First, the speaker on the sending side creates his/her initial character image (a fundamental character image) with the character data input means 101 of the character image creation means 100 in his/her image and voice communication device (hereinafter called a device in the sending side) in preparation for the dialog. In addition, the speaker on the sending side performs this operation while monitoring with the display means 103 the character image to be created. Thus, the character data inputted with the character data input means 101 is transformed into the predetermined dot data by the first transform means 102, and is displayed on the display means 103.

After this, the speaker on the sending side creates a predetermined character image having eyes, mouth, and the like changed from the initial character image, that is, representing the countenance changes. At the same time, the speaker creates also the respective levels of these changes (hereinafter called changed character image data). The number of the charged features of the character image corresponds to that of the command signal codes stored beforehand.

Next, the countenance detection means 105 detects the predetermined motion data of the eyes and mouth of the speaker on the sending side, and the countenance code transform means 108 creates the reference values of the countenance changes on the basis of these data. At this time, the number of reference values corresponds to the number of features of the character image which are changed from the initial character image, wherein the changed images are created by the character data input means 101.

In addition, in this creation process, each character image is transformed from character data to dot data by the first transform means 102 and is displayed on the display means 103, to allow the speaker on the sending side to perform the above-mentioned work while monitoring the work with the display means 103.

Next, the various types of character data created with the character image creation means 100, that is, the initial character image data, the character image data corresponding to countenance changes, and the reference value data corresponding to the countenance changes are stored in the first character data memory means 104 of the device on the sending side.

Here, the preparatory phase is completed. Additionally, it is assumed that similar preparation is performed on the device on the receiving side.

When the preparation is completed and communication with the device on the receiving side is started, the initial phase of negotiation is performed with a predetermined protocol. First, the first character data memory means 104 outputs various types of the above-mentioned character data for the speaker on the sending side. Thus, in the device on the sending side, the terminal 107a is selected by the first selection means 107, and the various types of the above-mentioned character data are sent from the first character data memory means 104 to the device on the receiving side via the data transmit means 106.

The device on the receiving side receives the character data of the speaker on the sending side with data receive means 111, selects a terminal 112a with second selection means 112, and stores the various types of the above-mentioned character data in second character data memory means 113.

In this negotiation phase, not only are various types of character data transmitted from the device on the sending side to the device on the receiving side, but various types of character data are also transmitted from the device on the receiving side to the device on the sending side. Therefore, the device on the sending side also stores the various types of character data of the speaker on the receiving side in the second character data memory means 113 of the receiving part of the device.

After the various types of the above-mentioned character data are mutually transmitted to the respective speaker's devices, the communication process moves to the dialog phase. First, switches in the first selection means 107 and second selection means 112 are switched to a terminal 107b and a terminal 112b respectively.

The device on the sending side detects motion of the eyes and mouth in the countenance of the speaker on the sending side using the countenance detection means of the device on the sending side. Further, the device transforms the change of the eye and mouth motions into serial command signal codes with countenance code transform means 108, and sends the codes to the device on the receiving side via data transmit means 106.

The transmit of the command signal codes in accordance with the eye and mouth motion data is synchronized with the detection of data corresponding to the head motion by the countenance detection means 105, whereupon the head motion data is transformed into a predetermined code with the countenance code transform means 108. After that, the device sends the code to the device on the receiving side via the data transmit means 106. The transmission of the command signal codes in accordance with the eye and mouth motion data is further synchronized with the transmission of the voice signal, which is detected with the countenance detection means 105 and is transmitted to the device on the receiving side via the data transmit means 106.

The device on the receiving side receives the command signal codes corresponding to the eye and mouth motion data of the speaker on the sending side with the data receive means 111. Then, the device processes the various types of character data of the speaker on the sending side, which are stored in the second character data memory means 113, according to the command signal codes with the character data process mean 114.

After this, the character data of the speaker on the sending side, which is processed with the data process means 114, is transformed with the second transform means 115 according to formats stored beforehand.

In addition, the device on the receiving side receives the code corresponding to the head motion data with the data receive means 111 in synchronization with the reception of the command signal codes corresponding to the eye and mouth motion data. Moreover, the device on the receiving side calculates the level of change with the image change means 117 based on the head motion code, performs a predetermined image processing to the character image data transformed with the second transform means 115, and displays the image in the display means 116. At this time, the display means 116 displays the character image of the speaker on the sending side substantially in real time.

Further, the device on the receiving side receives the voice signal of the speaker on the sending side in synchronization with the reception of the command signal codes, and plays back the voice signal with the voice playback means 118.

The above-described communication process is summarized as follows:

A: A Phase Before Communication (1) Speakers each create a character image that becomes the fundamental character image of herself/himself.

(2) The speakers each create data (data of changes from the fundamental character image: hereinafter called the changed character) representing the character image showing countenance changes (e.g., eyes and mouth motion) according to predetermined command signal codes.

(3) The speakers each detect the eye and mouth motions of his/her character image and set reference values (threshold values) of the countenance changes corresponding to the predetermined command signal codes.

B: An Initial Phase of the Communication (1) The fundamental character image of the speaker on the sending side is transmitted from the device on the sending side to the device on the receiving side, and is stored in a memory unit of the device on the receiving side.

(2) Changed character image data showing countenance changes corresponding to the predetermined command signal codes is transmitted from the device on the sending side to the device on the receiving side, and is stored in the memory unit of the device on the receiving side.

C: A Dialog Phase of the Communication (The Device on the Sending Side)

(1) The device on the sending side detects the eye and mouth motions of the speaker on the sending side at a predetermined timing.

(2) The device on the sending side transmits the predetermined command signal codes serially to the device on the receiving side in accordance with the detection of the eye and mouth motions of the speaker on the sending side and the threshold values.

(3) The device on the sending side detects the head motion of the speaker on the sending side at a predetermined timing, and serially transmits a corresponding motion code to the device on the receiving side. In addition, this head motion code is transmitted in synchronization with the transmission of the predetermined command signal codes described in item (2).

(4) The device on the sending side obtains the voice signal of the speaker on the sending side at the predetermined timing, and transmits this voice signal serially to the device on the receiving side. In addition, this voice signal is transmitted in synchronization with the transmission of the predetermined command signal codes described in item (2).

D: The Dialog Phase of the Communication (The Device on the Receiving Side)

(1) The device on the receiving side receives the predetermined command signal codes corresponding to the eye and mouth motions of the speaker on the sending side which are sent serially (substantially in real time) from the device on the sending side.

(2) The device on the receiving side receives the head motion code of the speaker on the sending side which is sent serially (substantially in real time) from the device on the sending side (in synchronization with item (1)).

(3) The device on the receiving side receives the voice signal of the speaker on the sending side which is sent serially (substantially in real time) from the device on the sending side (in synchronization with item (1)).

(4) The device on the receiving side retrieves and reads the character image data of the eye and mouth motions or the changed character image data corresponding to the command signal codes received in item (1) from the memory unit.

(5) The device on the receiving side displays in the display unit the character image of the speaker on the sending side substantially in real time, based on the character image data read in item (4) or the head motion code received in item (2).

(6) The device on the receiving side plays back the voice of the speaker on the sending side in real time based on the voice signal received in item (3).

The foregoing description presents an outline of the image and voice communication system of the first embodiment of the present invention, while the detailed construction and actions of the image and voice communication system of this first embodiment will be described below with reference to FIGS. 2–32.

Figure 2:
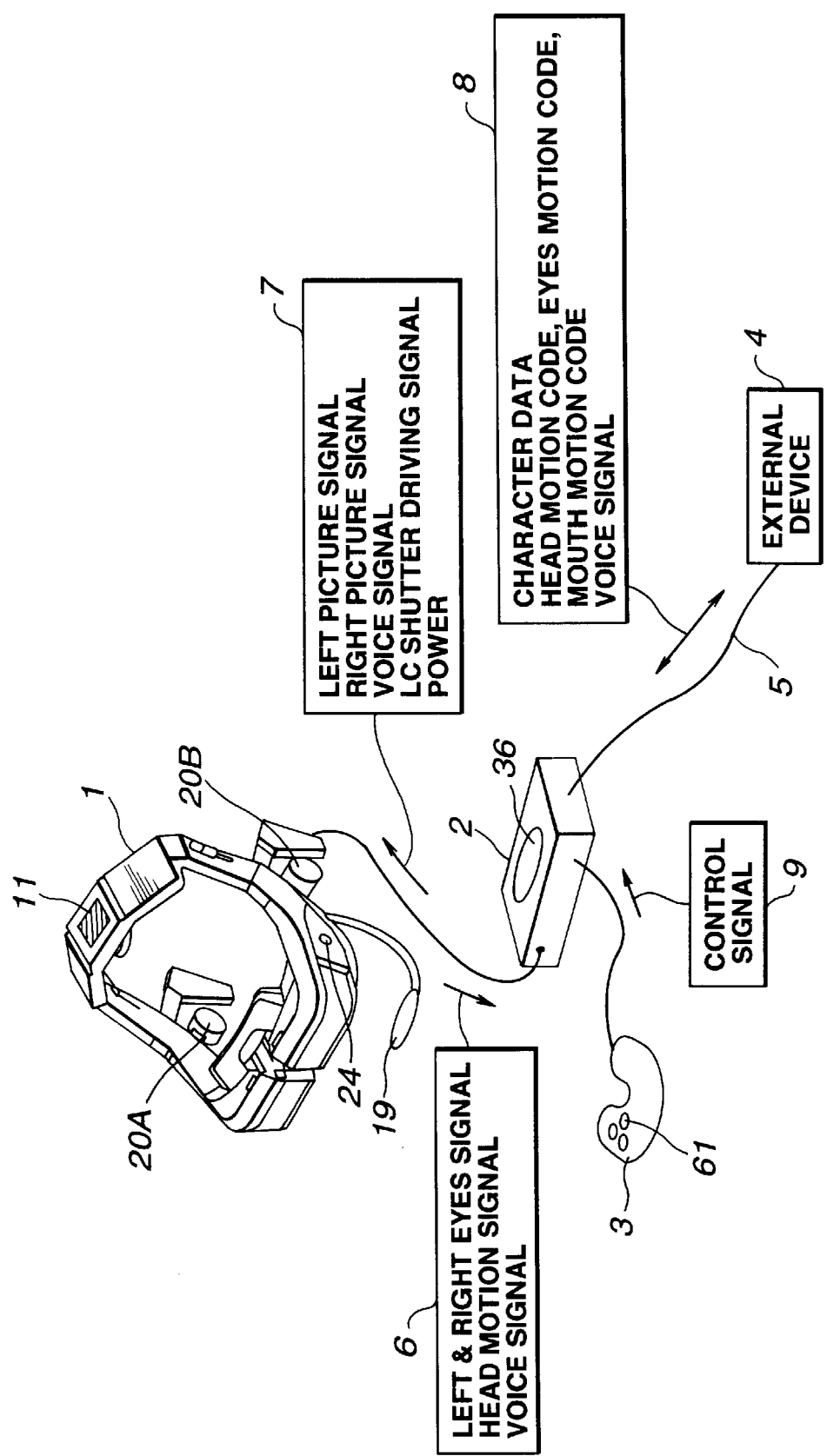
FIG. 2 is a system diagram showing the main construction of the image and voice communication system of the first embodiment according to the present invention.

FIG. 2 is an explanatory diagram showing the main construction of the image and voice communication system of the first embodiment according to the present invention.

As shown in the figure, the image and voice communication system of this first embodiment comprises a head mount display I (hereinafter called an HMD) which is to be mounted on the head of a user performing dialog through the image and voice communication system, to supply pictures and sound to the user based on the predetermined data from a picture creation box 2 described later, and to send information corresponding to motion of the eyes, head, and mouth and the voice of the user to the picture creation box 2. Thus, the picture creation box 2 of the image and voice communication system of this first embodiment is connected to the HMD 1, supplies power to the HMD, supplies a predetermined picture signal and a voice signal to the HMD 1, receives an eye signal (corresponding to the eye motion), a head motion signal (corresponding to the head motion), a mouth signal (corresponding to the mouth motion), and the like, and performs predetermined processing which will be described later.

In addition, the image and voice communication system of this first embodiment also comprises a controller pad 3 that is connected to the picture creation box 2, and sends a control signal 9 for character data creation to a character data memory 36. Moreover, the image and voice communication system of this embodiment further comprises an external device 4 that is connected to the picture creation box 2 via a typical telephone line, and transfers signals such as the character data, head motion code, eye motion code, mouth motion code, and voice signal (shown by reference code 8 in FIG. 2).

First, the HMD 1 will be described with reference to FIGS. 2 to 4.

Figure 3:
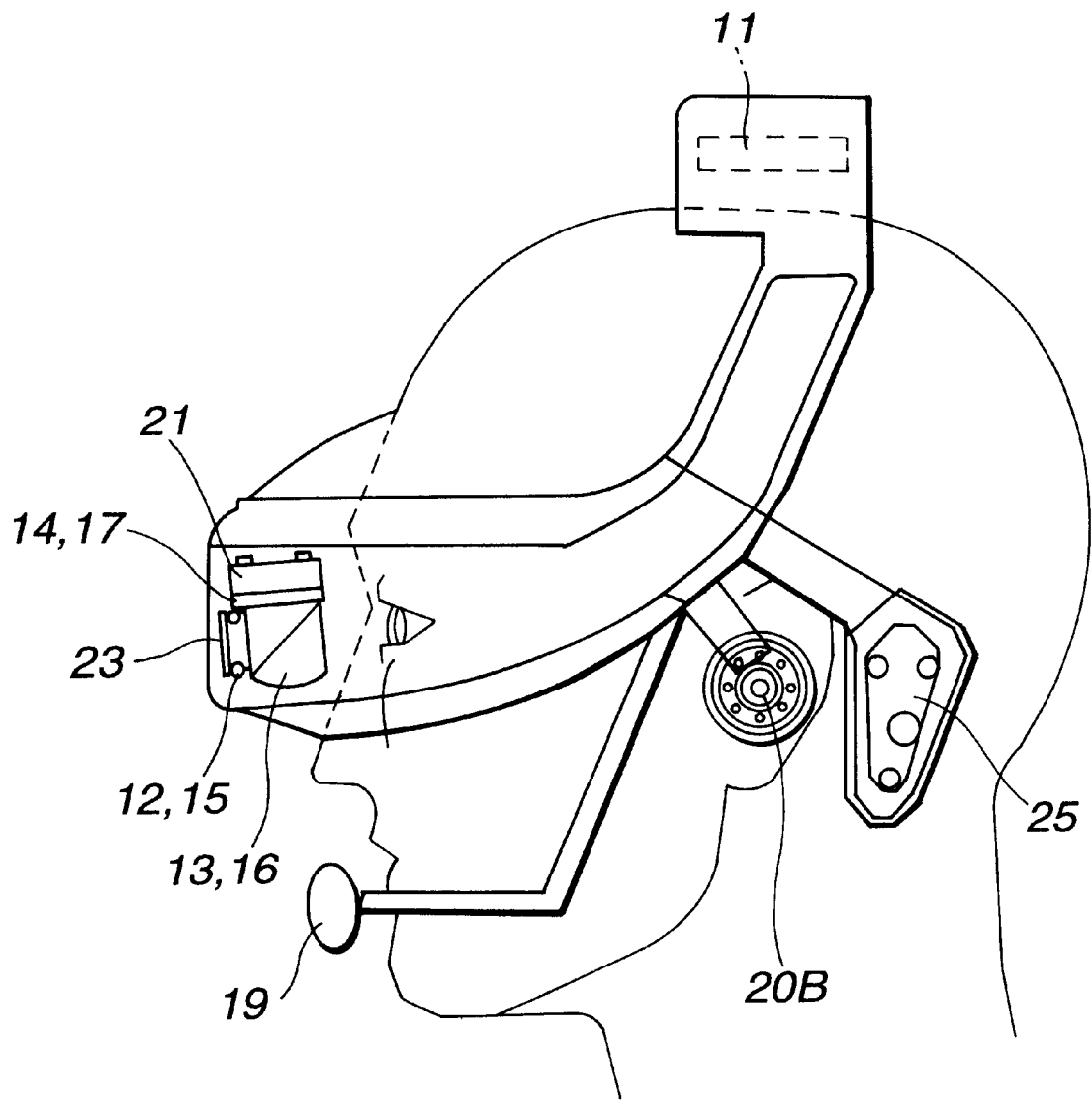
FIG. 3 is a side view of a user mounting an HMD in the image and voice communication system of the above-mentioned embodiment.

FIG. 3 is a side view of the HMD 1 mounted on a user.

Figure 4:
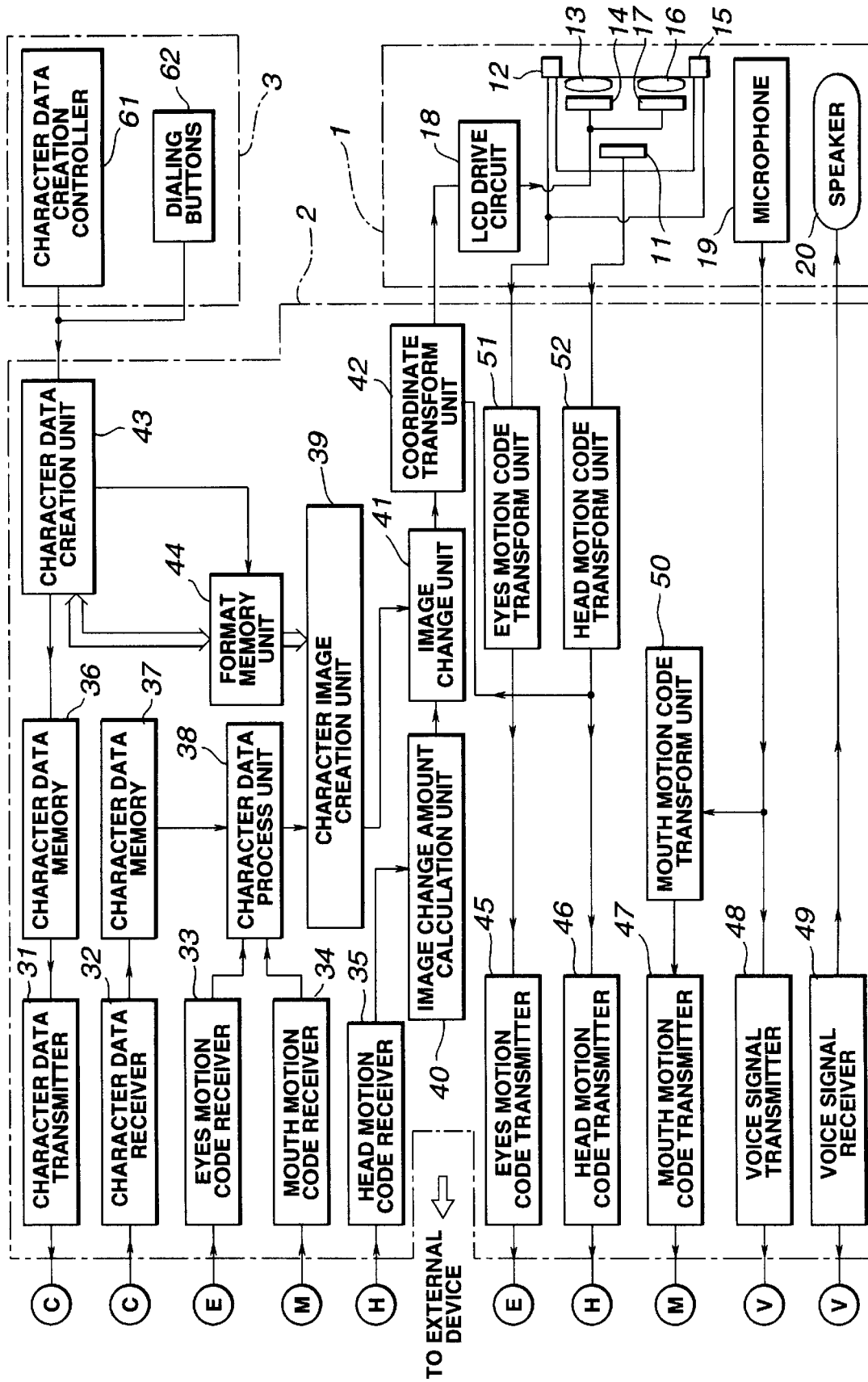
FIG. 4 is a block diagram showing connection of the HMD, a picture creation box, and a controller pad, and detailed the electrical circuit structure of these respective subassemblies in the image and voice communication system of the first embodiment.

In addition, FIG. 4 is a block diagram showing connection of the HMD 1, picture creation box 2, and controller pad 3, and detailed electrical circuit structure of these subassemblies.

The HMD 1, as shown in FIGS. 2 and 3 has eyepiece optical systems 13 and 16, a head motion sensor 11, a microphone 19, speakers 20A and 20B, a talk switch 24 or the like, all of which are located on a supporting body which is provided from the front of user's eyes to the top of the user's head, and is mounted as shown in FIG. 3 on the head of each user who performs dialog with this image and voice communication system. Thus, when the HMD 1 is mounted on a user's head, a picture part comprising the eyepiece optical systems is located in front of the user's eyes, the head motion sensor 11 is on the top of the user's head, the right and left speakers 20A and 20B are on right and left ears respectively (see FIG. 2), and the microphone 19 extending from the supporting body is in front of the user's mouth. Further, the HMD 1 is supported on the user's head with supporting parts 25 located behind the user's ears. Moreover, the talk switch 24 which serves as an off-hook switch at the beginning of the communication process is located on one side of the supporting body.

In addition, a connection cord for connecting to the picture creation box 2 is provided from the supporting part 25, whereby the HMD 1 displays the predetermined motion upon receiving the left and right picture signals, voice signal, liquid crystal shutter drive signal, power, and the like (shown by reference numeral 7 in FIG. 2) from the picture creation box 2.

Here, the construction of the eyepiece optical systems and their peripherals in the HMD 1 will be described in further detail with reference to FIGS. 3 and 4.

As described above, left and right eyepiece optical systems 16 and 13 are located in front of the user's eyes, and a left LCD 17 and a right LCD 14 are located above these left and right eyepiece optical systems 16 and 13 respectively. In addition, back lights 21 are located on these left and right LCDs 17 and 14, and a liquid crystal shutter 23 is located in front of the left and right eyepiece optical systems.

The left and right LCDs 17 and 14 are driven by an LCD drive circuit 18 (FIG. 4) located inside the HMD 1, and the LCD drive circuit 18 is controlled by picture creation box 2. Similarly, the liquid crystal shutter 23 and back light 21 are also connected to and controlled by the picture creation box 2.

Thus, the left and right LCDs 17 and 14, liquid crystal shutter 23, and back lights 21 operate in response to left and right picture signals and a liquid crystal shutter drive signal from the picture creation box 2, whereby a predetermined picture is supplied to the user.

In addition, left and right speakers 20A and 20B play back predetermined voice patterns in response to the voice signal from the picture creation box 2.

A left eye detection unit 15, a right eye detection unit 12, and a light source 22 for the eye detection units are located in the vicinity of the left and right eyepiece optical systems 16 and 13. Eye information detected by the left and right eye detection units 15 and 12 is sent to an eye motion code transform unit 51 in the picture creation box 2.

The eye information from these left and right eye detection units 15 and 12 is used not only as predetermined initial settings, but also as the user's eye motion information during dialog, which will be discussed later in detail.

Moreover, the head motion sensor 11 is a sensor which detects the user's head motion in three dimensions and sends the three-dimensional information corresponding to the head motion to a head motion code transform unit 52 in the picture creation box 2.

The data from this head motion sensor 11 is also used as the user's head motion information during dialog.

The microphone 19 serves to collect the user's voice during the dialog in a typical voice recording unit and also to detect the user's mouth motion under predetermined conditions. Thus, when the predetermined initial data is set, the voice signal from the microphone 19 is sent to the mouth motion code transform unit 50 in the picture creation box 2. During the dialog, the voice signal obtained with the microphone 19 is transmitted to the communication mate by sending the voice signal to a voice signal transmitter 48 in the picture creation box 2. At the same time, the user's mouth motion during the dialog is detected and the information is sent to the mouth motion code transform unit 50 in the picture creation box 2. Further, this will be described later in detail.

Next, the construction of the picture creation box 2 will be described in further detail with reference to FIG. 4.

The picture creation box 2 has various transmitters and receivers as shown in FIG. 4 to perform the transfer of signals such as the character data, head motion code, eye motion code, mouth motion code, and voice signal (shown by reference numeral 8 in FIG. 2).

For example, the transmission/reception of the predetermined character data between the image and voice communication device used by a speaker and an external device 4, i.e., the image and voice communication device used by a mate speaker, is performed with a character data transmitter 31 and a character data receiver 32. Similarly, the transmission/reception of the eye motion code, mouth motion code, and head motion code is performed with an eye motion code receiver 33, an eye motion code transmitter 45, a mouth motion code receiver 34, a mouth motion code transmitter 47, a head motion code receiver 35, and a head motion transmitter 46, respectively.

Additionally, the transmission/reception of the voice signal from the dialog with the communication mate is performed with a voice signal transmitter 48 and a voice signal receiver 49.

Each of the units performing creation, processing, and storage of character data in the image and voice communication system of a preferred embodiment further described below in the order encountered along a signal flow path.

In the image and voice communication system of the present embodiment, character data corresponding to the transmitter's character image used to conduct the dialog is created with the character data creation unit 43 according to command signal codes stored in the format memory unit 44. The controller pad 3 is connected to this character data creation unit 43 via a connection cord as shown in FIG. 2. A control signal 9 (see FIG. 2) is sent to the character data creation unit 43 by operating a character data creation controller 61 and dialing buttons 62 located in the controller pad 3. The predetermined data of the user's selected character image is transmitted to the HMD 1 through a character image creation unit 39, and the created character image is displayed on the monitor screen of the HMD 1.

It is assumed, for purposes of illustration of the present embodiment, that a "speaker" is a speaker on the sending side, and a "device" used by the speaker on the sending side is a device on the sending side. Then, a character image of the speaker on the sending side and various types of character data according to the character images are created in the character data creation unit 43 in the picture creation box 2 of the device on the sending side. Thus, the character data of a speaker on the receiving side is created for the speaker on the sending side by a character data creation unit 43 of the device on the receiving side.

Referring once again to FIG. 4, the character data creation unit 43 creates several sets of character data corresponding to a character image of the speaker on the sending side and changes in the character image. That is, a user (the speaker on the sending side) first optionally creates the predetermined character image in a preparatory phase before communication by operating the character data creation controller 61 and dialing buttons 62. Subsequently, the user creates changed character images by inputting the predetermined changes for the character image.

The user creates a fundamental character image which is the user's initial character image, using a method which will be described later, while the user sets data corresponding to changed character images which represent countenance changes such as the motion of the user's eyes, mouth, and the like. The number of the changed character images corresponding to the countenance changes is equal to the number of patterns represented by the command signal codes stored in a format memory unit 44 beforehand. The changed character images corresponding to the countenance changes are actually determined by the level of change from the fundamental character image.

The command signal codes stored in the format memory unit 44 will be described later in detail.

In the preferred embodiment, creation of the fundamental character image and data input of the changed character images from the fundamental character image are performed with the controller pad 3. However, the means for the data input is not limited to the controller pad. For example, optional image data (such as a photograph of the user's face or the like) collected with an electronic camera, a scanner, or the like can be used instead of the controller pad.

Furthermore, in the preparatory phase before communication, the user (the speaker on the sending side) sets the reference values of the countenance changes on the basis of the eye and mouth motion of the speaker on the sending side which is detected in the HMD 1 with the eye motion code transform unit 51 and/or mouth motion code transform unit 50.

In addition, the reference values each define a threshold value used to determine whether the appropriate command signal code is outputted in accordance with the level of the countenance change of the speaker on the sending side.

As described above, the HMD 1 is provided with left and right eye detection units 15 and 12 and the microphone 19 (see FIG. 3). Therefore, the HMD 1 detects the motion of the speaker's eyes with the left and right eye detection units 15 and 12, and of the speaker's mouth with the microphone 19. The detection results are sent to either the mouth motion code transform unit 50 or the eye motion code transform unit 51 as shown in FIG. 4.

Thus, the HMD 1 is used to determine the reference values of the countenance changes and also to detect and send countenance changes (of the eyes, mouth, and head motion) of the speaker on the sending side during the dialog.

The output terminal of the character data creation unit 43 is connected to the character image creation unit 39 as described above, and is further connected to the display unit (the optical systems such as eyepiece optical systems 13 and 16) of the HMD 1 via the character image creation unit 39. Thus, a user can monitor the creation of the character images when the HMD 1 is mounted on the user's head.

The output terminal of the character data creation unit 43 is additionally connected to the character data memory 36. The character data memory 36 stores the data of the fundamental character image for the speaker on the sending side which was created with the character data creation unit 43, and further stores the data of the changed character images (data representing the amount of change from the fundamental character image) corresponding to command signal codes stored in the format memory unit 44.

Furthermore, the character data transmitter 31 is connected to the character data memory 36, which transmits the fundamental character image and the character data corresponding to the changed character images of the speaker on the sending side stored in the character data memory 36 to the device on the receiving side during the initial phase of communication.

A character data memory 37 storing various types of character data created with the device on the receiving side is connected to an output terminal of a character data receiver 32 receiving the fundamental character image and the character data representing the changed character images of the speaker on the receiving side. The character data memory 37 temporarily stores various types of character data of the speaker on the receiving side during the initial phase of communication.

The discussions above have focused on the elements in the image and voice communication system of the present embodiment which are mainly used in the preparatory phase or initial phase of communication. Next, components mainly used in the dialog phase of the communication will be described.

The image and voice communication system of the preferred embodiment detects the countenance change of the speaker on the sending side at the predetermined timing with the HMD 1 during the dialog and transforms this countenance change into a predetermined code for further transmission. Specifically, output terminals of the right eye detection unit 12 and the left eye detection unit 15 in the HMD 1 are connected to an eye motion code transform unit 51, an output terminal of which is connected to an eye motion code transmitter 45. In addition, an output terminal of a head motion sensor 11 in the HMD 1 is connected to a head motion code transform unit 52, an output terminal of which is connected to a head motion code transmitter 46. An output terminal of the microphone 19 is connected to a mouth motion code transform unit 50 and a voice signal transmitter 48, and an output terminal of the mouth motion code transform unit 50 is further connected to a mouth motion code transmitter 47.

In the dialog phase of communication, the eye motion code transform unit 51 transforms a detected motion of the speaker's eyes into a corresponding code. The transform unit 51 also transforms the reference values to establish the predetermined conditions for changing the character image. The transform unit 51 then sends the eye motion code to the speaker on the receiving side through the eye motion code transmitter 45.

The reference value for the head motion is stored in the head motion code transform unit 52 before shipping from the manufacturing site.

The head motion code transform unit 52 receives the head motion data detected with the head motion sensor 11 in the HMD 1, transforms the data into a head motion code for the speaker on the sending side, and sends the code to the speaker on the receiving side through the head motion code transmitter 46.

The mouth motion code transform unit 50 transforms the voice data collected with the microphone 19 in the HMD 1 into a mouth motion code of the speaker on the sending side and sends the code to the receiving side through the mouth motion code transmitter 47. Meanwhile, the voice signal from the microphone 19 is transmitted to the speaker on the receiving side as a voice signal through a voice signal transmitter 48. The speaker on the receiving side receives the voice signal through a voice signal receiver 49 and plays back the voice signal with a speaker 20 in the HMD 1.

Next, units receiving various types of character data transmitted from the communication mate's device (the receiving side) in the dialog phase of communication will be described.

In the dialog phase of communication, the various types of data for the speaker on the sending side sent from the eye motion code transmitter 45, head motion code transmitter 46, mouth motion code transmitter 47, and voice signal transmitter 48 are received with an eye motion code receiver 33, a mouth motion code receiver 34, a head motion code receiver 35, and a voice signal receiver 49, respectively.

The eye motion code receiver 33 and mouth motion code receiver 34 are receivers receiving the eye motion code and mouth motion code that are sent from the device on the receiving side. Additionally, output terminals of the eye motion code receiver 33, mouth motion code receiver 34, and character data memory 37 are connected to a character data process unit 38.

The character data process unit 38 processes "eye motion" and "mouth motion" among the character data stored in the character data memory 37 according to the eye motion code and mouth motion code of the speaker on the receiving side and outputs the processed data to a character image creation unit 39.

The character image creation unit 39 creates the communication mate's final character image on the basis of the communication mate's character data processed with the character data process unit 38, and outputs the character image to the image change unit 41.

In addition, the head motion code receiver 35 is a receiver receiving the head motion code sent from the device on the receiving side, an output terminal of which is connected to the image change unit 41 via an image change amount calculation unit 40. The image change amount calculation unit 40 calculates the amount of change in the image based on the head motion code from the device on the receiving side. Then, the next stage of the image change unit 41 changes the character image of the mate's speaker in accordance with the result of the calculation.

Thus, the image change unit 41 changes the mate's initial character image created with the head motion of the speaker on the receiving side which is received by the head motion code receiver 35 to reflect the character image creation unit 39.

An output of the image change unit 41 is connected to a coordinate transform unit 42, which performs coordinate transformation of the mate's character image that is changed with the image change unit 41, whereupon the changed character image is sent to the HMD 1 on the side monitoring the character image. The coordinate transformation in the coordinate transform unit 42 is effectuated by determining transform vectors of the mate's character image displayed on the monitor screen in accordance with the head motion of the speaker on the sending side.

On the other hand, the voice signal receiver 49 is a receiver that receives a voice signal from the device on the receiving side, whereupon the received voice signal of the speaker on the receiving side is sent to the speakers 20A and 20B in the HMD 1 for playback on the sending side.

Furthermore, in this embodiment, the microphone 19 is located so that it may be positioned in front of user's mouth when the HMD 1 is mounted, but its location is not limited to this. For example, the microphone 19 can be located in the vicinity of the optical system of the HMD 1 (reference numeral 19A in FIG. 6), which allows the construction of the HMD 1 to be simplified.

The foregoing discussions have provided a detailed explanation of the image and voice communication device used by each speaker according to a preferred embodiment thereof. The following discussions will provide a detailed description of the use of the above system.

Figure 5:
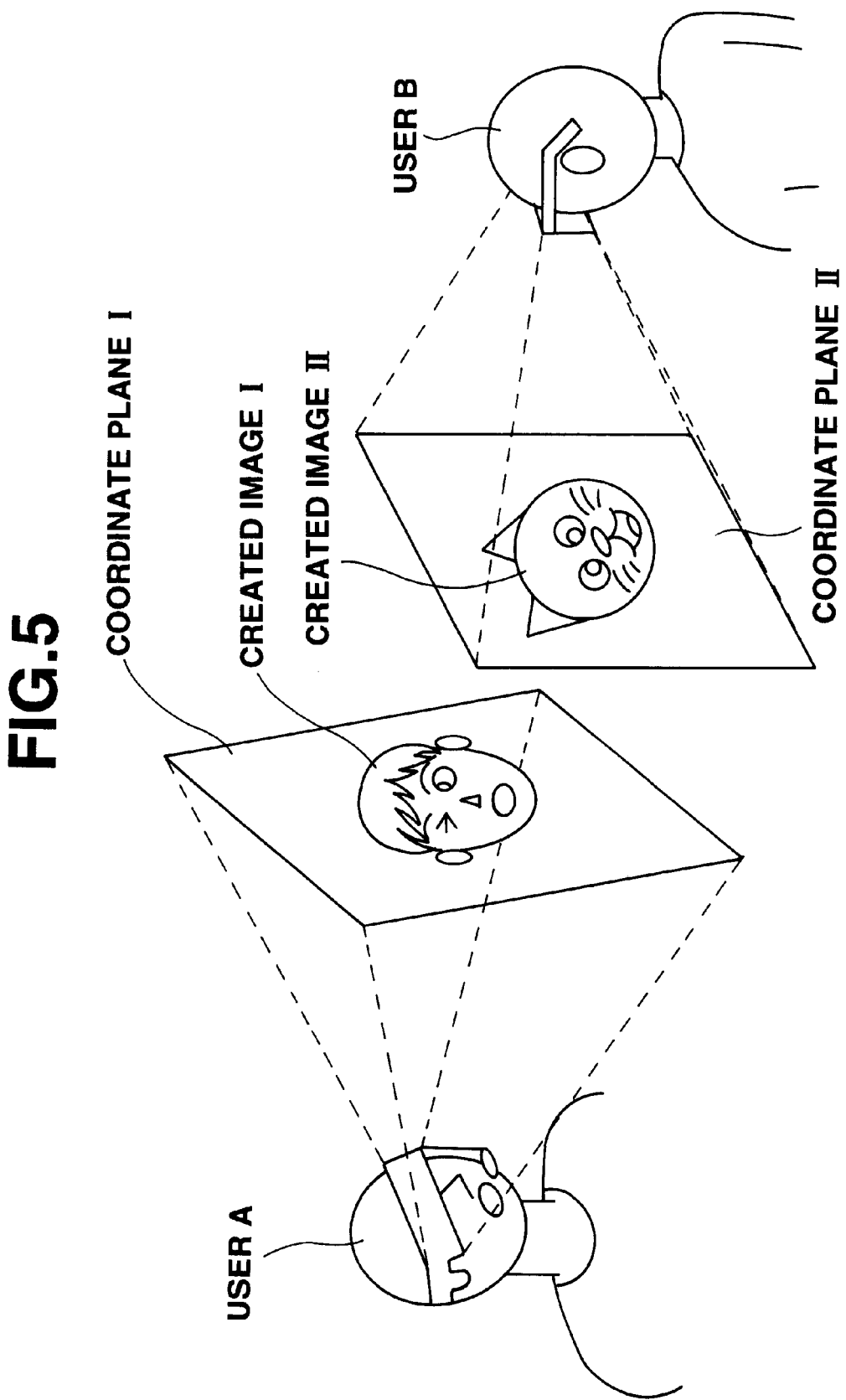
FIG. 5 is an overhead view showing the status of a user actually using the image and voice communication system of the above-mentioned first embodiment.
Figure 6:
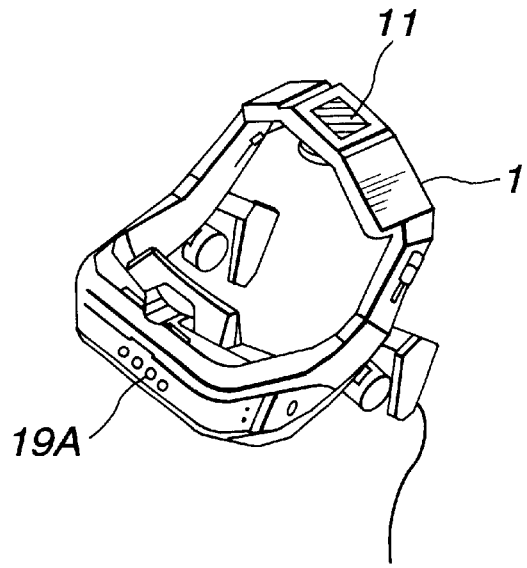
FIG. 6 is a perspective view of a main part showing a modified example of a microphone mounted to an HMD in the image and voice communication system of the above-mentioned first embodiment.

As shown in FIG. 5, two speakers perform dialog with HMDs mounted to their respective heads. A character image of the opposing speaker is displayed on a monitor screen of each speaker. Thus, it is assumed that one speaker is user "A", the other speaker is user "B", a character image of the user "A" is a created image II in the figure, and a character image of the user "B" is a created image I in the figure (shown by coordinate planes I and II in the figure respectively).

In the image and voice communication system of the preferred embodiment, as a preparatory phase before communication, each speaker inputs a predetermined setting of their respective self character images into their respective image and voice communication devices.

First, the actions in the preparatory phase before communication are as follows (1) creating a fundamental character image of himself/herself, (2) creating the data (data representing an amount of change to the fundamental character image, hereinafter called the changed character image data) for new character images representing countenance changes from the fundamental character image (eyes and mouth motion) which correspond to predetermined command signal codes, (3) detecting the motion of the user's own eyes and mouth, and to set reference values for the countenance changes in accordance with predetermined command signal codes.

Figure 7:
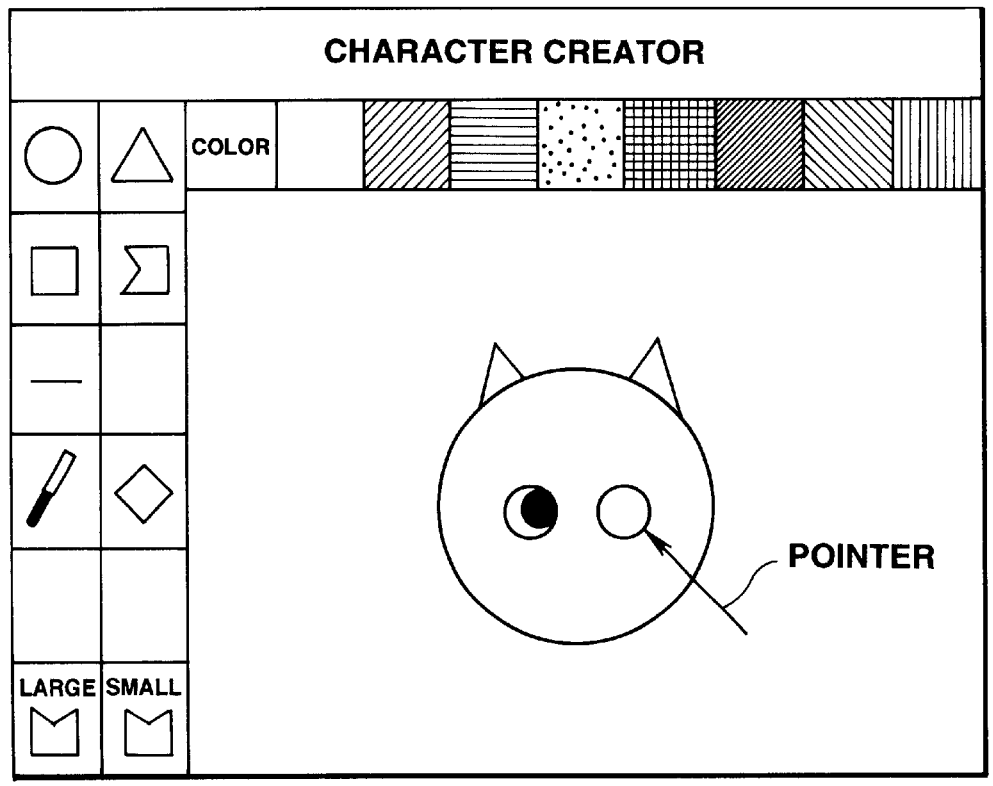
FIG. 7 is an explanatory drawing showing an example of an HMD monitor screen at the time of using predetermined character image creation software in the image and voice communication system of the above-mentioned first embodiment.

Each of these operations will be described with reference to FIGS. 7 and 15.

In the image and voice communication system of the first embodiment, the character data created by the speaker on the sending side as described above is created in the character data creation unit 43 of the picture creation box 2 using a suitable graphics creation software program stored in the format memory unit 44.

First, the user mounts the HMD 1 and sets the HMD 1 in a character data creation mode by a predetermined operation using a character data creation controller 61, dialing buttons 62 or the like on the controller pad 3. When the HMD 1 is set to character data creation mode, the creation software is activated in the character data creation unit 43. Upon activation, an application window of the character data creation software, shown in FIG. 7, is displayed on the monitor screen of the HMD 1. Hereinafter, actions will be described with reference to flow charts shown in FIGS. 8 and 10.

First, when the character data creation software is started, the user creates a fundamental drawing of the character image (step S1). To do so, the user (the speaker on the sending side) operates the character data creation controller 61, dialing buttons 62, or the like on the controller pad 3 to create the user's own character image while monitoring the created image on the monitor screen of the HMD 1.

Figure 11:
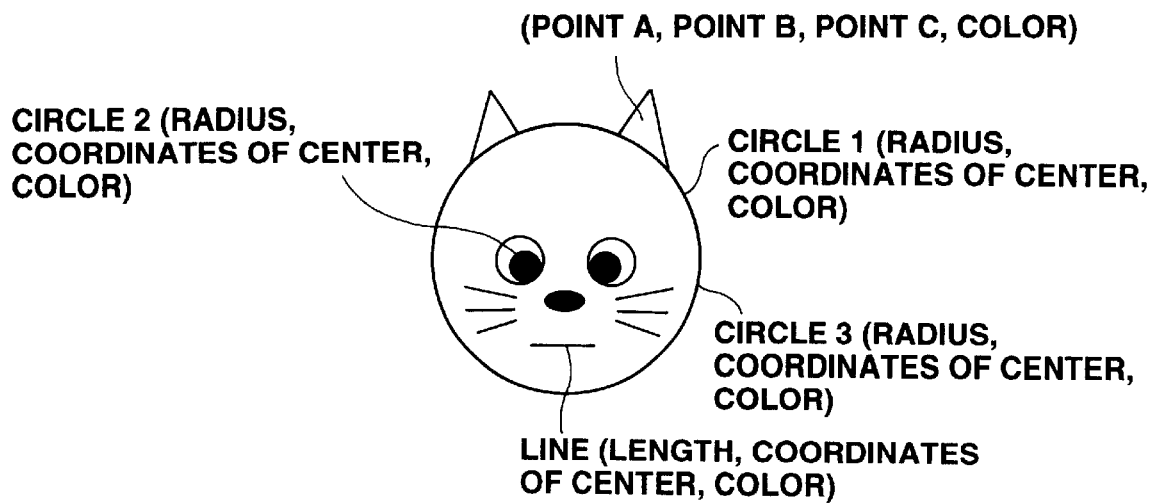
FIG. 11 is a schematic diagram showing an example of a fundamental character image of a speaker in a sending side, in the image and voice communication system of the first embodiment.

In the present example, the user (the speaker on the sending side) has selected her/his own character image to be a cat face as shown in FIG. 11. Specifically, a large circle 1 (its radius, coordinate values of a center, and color are set) representing a contour of a face, a circle 3 (similar to the circle above, its radius, coordinate values of a center, and color are set) representing an eye, a circle 2 (similar) to the circle above, its radius, coordinate values of a center, and color are set) representing a pupil, and a line (its length, coordinate values of a center, and color are set) representing a mouth are set as character data for the fundamental drawing of the character image.

After completion of the character image, the character data of the character image is stored in the character data memory 36 (step S2). The character image stored as the fundamental drawing is then processed according to predetermined conditions (step S3).

Figure 12:
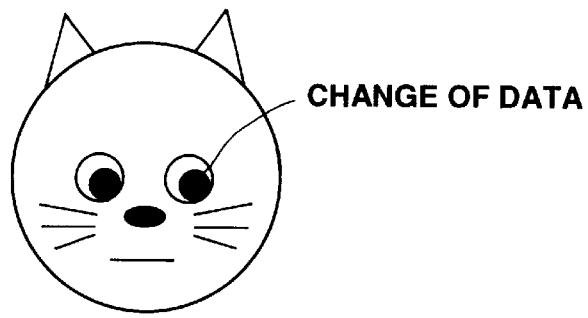
FIG. 12 is a schematic diagram showing an example of a character image at the time when the speaker moves his/her eyes to the left, which is created by processing the fundamental character image of the speaker in the sending side, in the image and voice communication system of the first embodiment.

Based on the fundamental drawing of the cat face shown in FIG. 11, a drawing of the eyes looking to the left is created (step S11), by changing the coordinate values of the center of the circle 2 representing a pupil using the controller pad 3 (FIG. 12). Next, in the drawing processed in step S11, the amount of change from the fundamental drawing (the amount of which the coordinates of the center of the pupil move) is stored with code "EL" (step S12).

Next, a drawing of the eyes looking to the right is created (step S13) in a similar fashion. Specifically, the user changes the coordinate values of the center of the circle 2 representing a pupil with using the controller pad 3 to create the charged countenance having the eyes looking to the right. The amount of change from the fundamental drawing processed at step S13 is stored with code "ER" (step S14).

Figure 13:
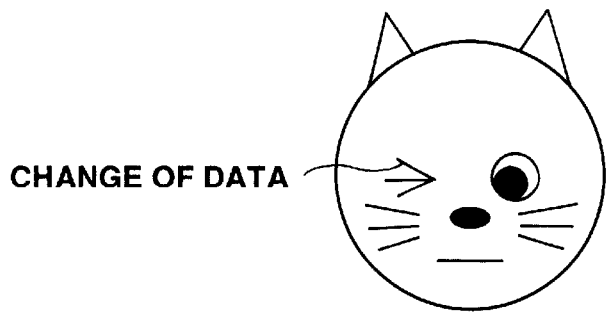
FIG. 13 is a schematic diagram showing an example of a character image at the time when the speaker closes his/her eyes, which is created by processing the fundamental character image of the speaker in the sending side, in the image and voice communication system of the first embodiment.
Figure 14:
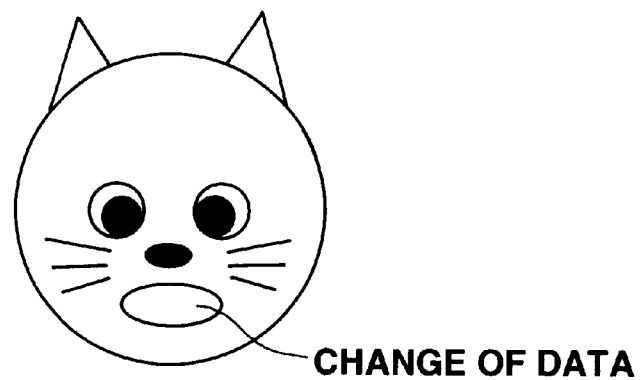
FIG. 14 is a schematic diagram showing an example of a character image at the time when the speaker opens his/her mouth, which is created by processing the fundamental character image of the speaker in the sending side, in the image and voice communication system of the first embodiment.

Subsequently, a drawing representing a closed eye in the fundamental drawing is created (step S15) by changing the data of one of the circles 2 representing a pupil and the corresponding circle 3 representing an eye to create the countenance having one eye closed (FIG. 13). The amount of change from the fundamental drawing processed in step S15 is stored with code "EC" (step S16).

Then, a drawing representing a mouth movement (which should be accompanied by a voice output) is created (step S17) by changing the data of the line representing a mouth using the controller pad 3 to create the countenance having an open mouth as shown in Figure A. The amount of change from the fundamental drawing as processed in step S17 is stored with code "M" (step S18), and the process returns to the main routine.

Figure 8:
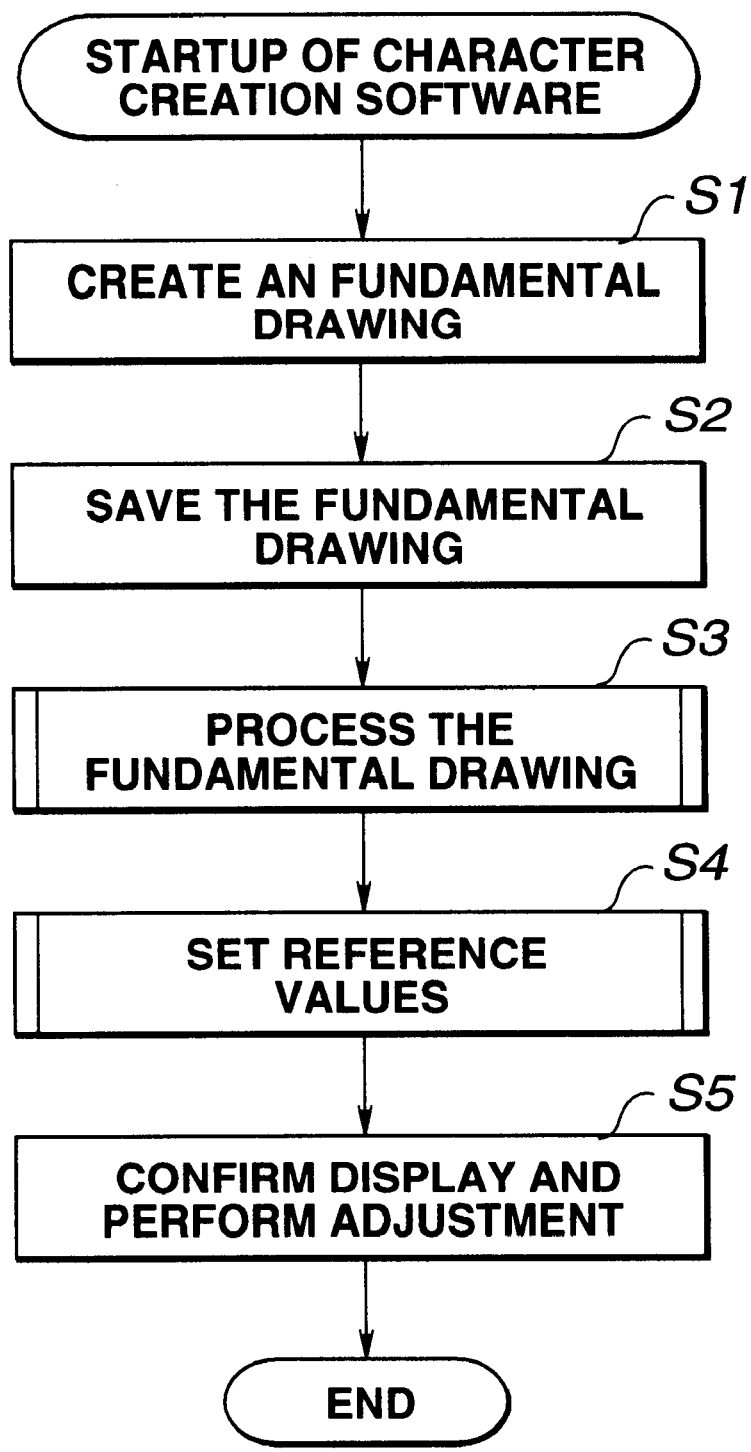
FIG. 8 is a flow chart showing work of creating fundamental character image data of a speaker in a sender side, and various types of data relating to the character image, in the image and voice communication system of the first embodiment.
Figure 9:
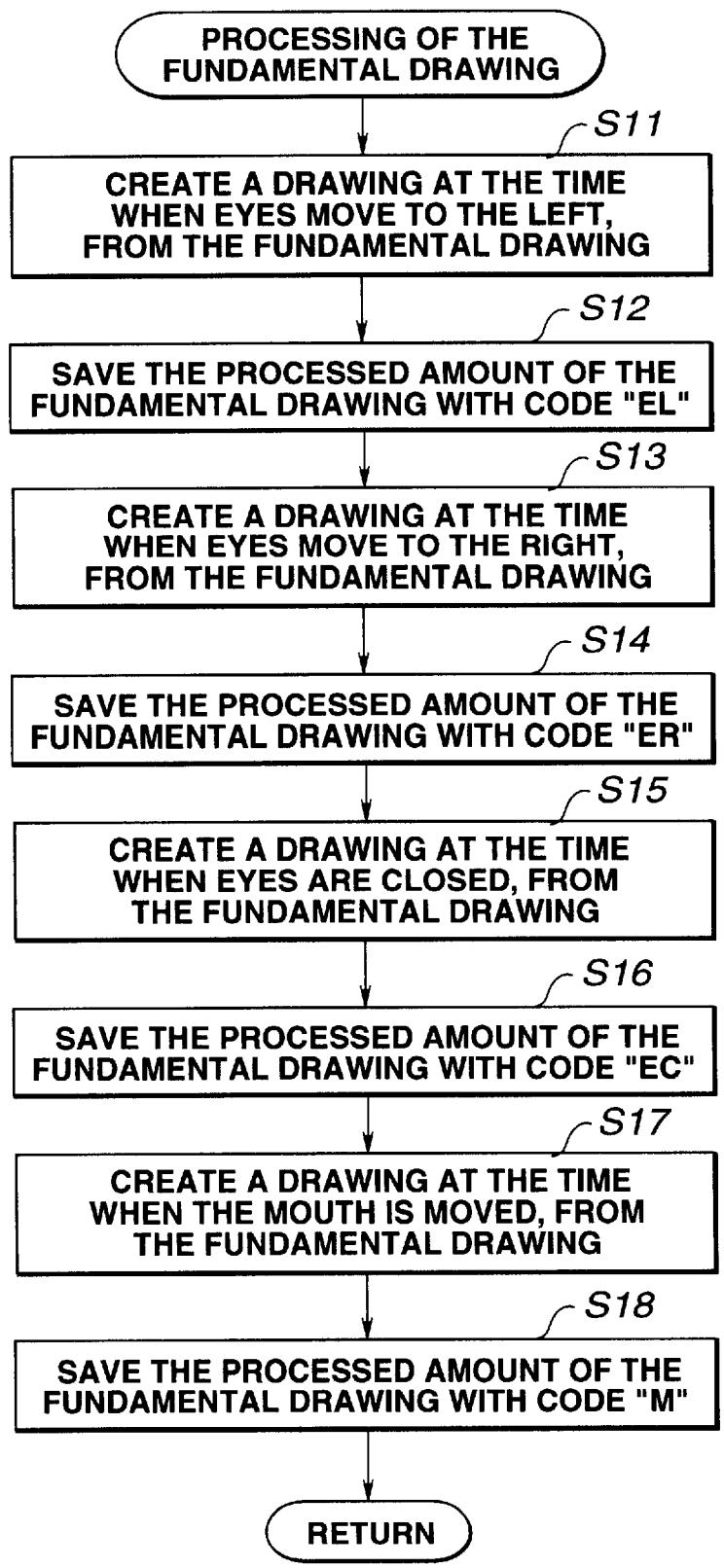
FIG. 9 is a flow chart showing work of performing predetermined processing for the fundamental character image of a speaker in a sending side and creating predetermined codes according to the processing, in the image and voice communication system of the first embodiment.

Referring briefly back to FIG. 8, the correspondence of the eye motion and mouth motion with respect to the fundamental drawing is determined (step S4), and will be described below.

The HMD 1, which is mounted to the head of the user (the speaker on the sending side) detects the user's actual eye and mouth motions and associates the detected movements to the respective character images processed representing the eye and mouth motions.

First, the user's eye motion is detected with an eye detection mechanism as will be described with reference to FIGS. 15 to 19.

Figure 15:
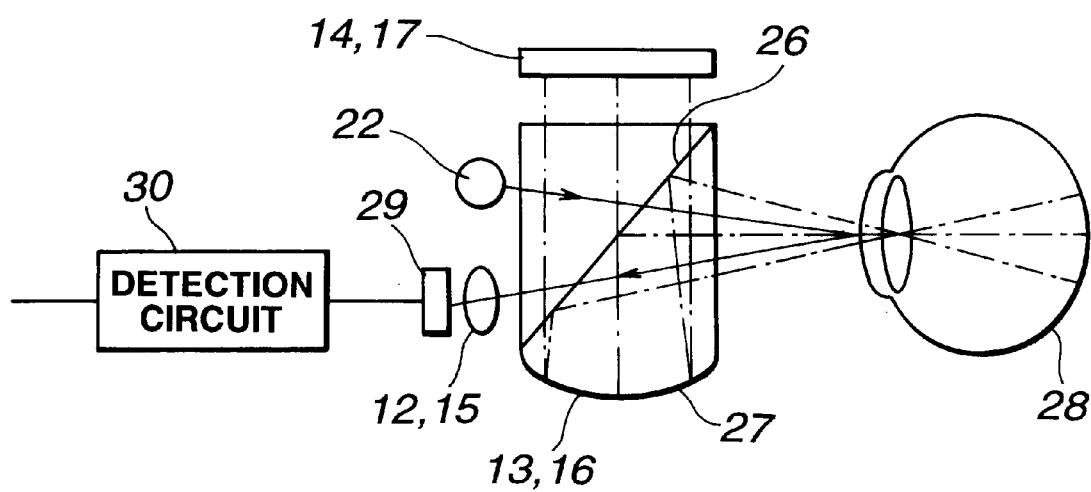
FIG. 15 is an explanatory drawing showing an eye detection mechanism and its peripheral part, in the image and voice communication system of the first embodiment.
Figure 16:
FIG. 16 is an explanatory drawing showing the potential generated according to an eye detected by the eye detection mechanism shown in FIG. 15, and an eye position (a reference position) that is set in correspondence to the potential, in the image and voice communication system of the first embodiment.
Figure 17:
FIG. 17 is an explanatory drawing showing the potential generated according to an eye detected by the eye detection mechanism shown in FIG. 15, and an eye position (closed) that is set in correspondence to the potential, in the image and voice communication system of the first embodiment.

FIG. 15 is an explanatory drawing showing the eye detection mechanism and its peripheral parts. The same reference numerals are used for the same components as those shown in FIGS. 3 and 4.

The left and right eyepiece optical systems 13 and 16 each include a prism having a half mirror surface 26, and is located in front of the user's eyeball 28 when the HMD 1 is mounted on the user's head. In addition, each of the bottom surfaces of the eyepiece optical systems 13 and 16 is a concave mirror as shown by reference numeral 27. An infrared light source 22 and left and right eye detection units 12 and 15 to detect the infrared light reflected by the user's eyes 28 are located in front of the eyepiece optical systems 13 and 16.

Each of the left and right eye detection units 12 and 15 comprises a CCD 29 and a detection circuit 30, and detects the surface of the eyeball illuminated by the infrared light irradiated from the infrared light source 22, i.e., an iris or a pupil position. The image of the surface of each eyeball enters into the CCD 29 after being enlarged with the concave mirror 27 and is subsequently inputted to the next stage of detection circuit 30, whereby the direction of focus of the user's eyes and the user's blink motions are detected.

In addition, the level of precision of the CCD 29 and detection circuit 30 need not be high, so that the horizontal resolution may be nearly 5°.

The correspondence of the user's eye motions and blinks (closed eyes) to the respective character images processed and stored in steps S11 to S16 is performed in the image and voice communication system of the present embodiment as follows.

First, a voltage value of 0 mV is defined as the reference voltage value for the dark current of the CCD 20 which is detected with the detection circuit 30. Thus, when the user's pupil is positioned almost in the center, a voltage signal of +20 mV, for example, is set to be output from the CCD 29 to the detection circuit 30 (see FIG. 16).

The detection circuit 30 is further set so that when the pupil moves to the left, i.e., the user's eyes look to the left, a voltage signal of +30 mV may be outputted in the present example. Similarly, when the pupil moves to the right or when the user's eyes look to the right, a +10 mV voltage signal may be outputted (see FIGS. 17 and 18). Furthermore, the circuit 30 is set so that when the eyes are closed, as in a blink, the reference voltage of 0 mV maybe outputted (see FIG. 19).

Figure 18:
FIG. 18 is an explanatory drawing showing the potential generated according to an eye detected by the eye detection mechanism shown in FIG. 15, and an eye position (moved to the left) that is set in correpondence to the potential, in the image and voice communication system of the first embodiment.
Figure 19:
FIG. 19 is an expelanatory showing the potential generated according to an eye detected by the eye detection mechanism shown in FIG. 15, and an eye position (closed) that is set in correspondence to the potential, in the image and voice communication system of the first embodiment.

Referring back to FIG. 10, when the user moves his/her eyes to the left, the left and right eye detection units detect this motion, and the detection circuit 30, as described above, outputs a voltage signal of +30 mV relative to the reference potential (step S22, see FIG. 18). The voltage signal value of +30 mV is then stored in an eye motion code transform unit 51 of the picture creation box 2 as a reference value of the code "EL" corresponding to FIG. 12 showing the state where the eyes are moved to the left (step S23).

Next, when the user moves his/her eyes to the right and the left and right eye detection units detect this eye motion (step S24), the detection circuit 30 outputs a voltage signal of +10 mV relative to the reference potential as described above (step S25, see FIG. 17). The voltage signal value of +10 mV is then stored in the eye motion code transform unit 51 of the picture creation box 2 as a reference value of the code "ER" corresponding to the drawing showing the state where the eyes are moved to the right (step S26).

When the user closes his/her eyes and the eye detection units 12 and 15 detect that the eyes are closed (step S27), the detection circuit 30 outputs a voltage signal of +0 mV relative to the reference potential as described above (step S28, see FIG. 19). The voltage signal value of +0 mV is then stored in an eye motion code transform unit 51 of the picture creation box 2 as a reference value of the code "EC" corresponding to FIG. 13 showing the state where the eyes are closed (step S29).

Finally, the user's mouth motion is detected whether or not the user vocalizes (step S30). The voice detection mechanism is described below with reference to FIG. 20.

Figure 20:
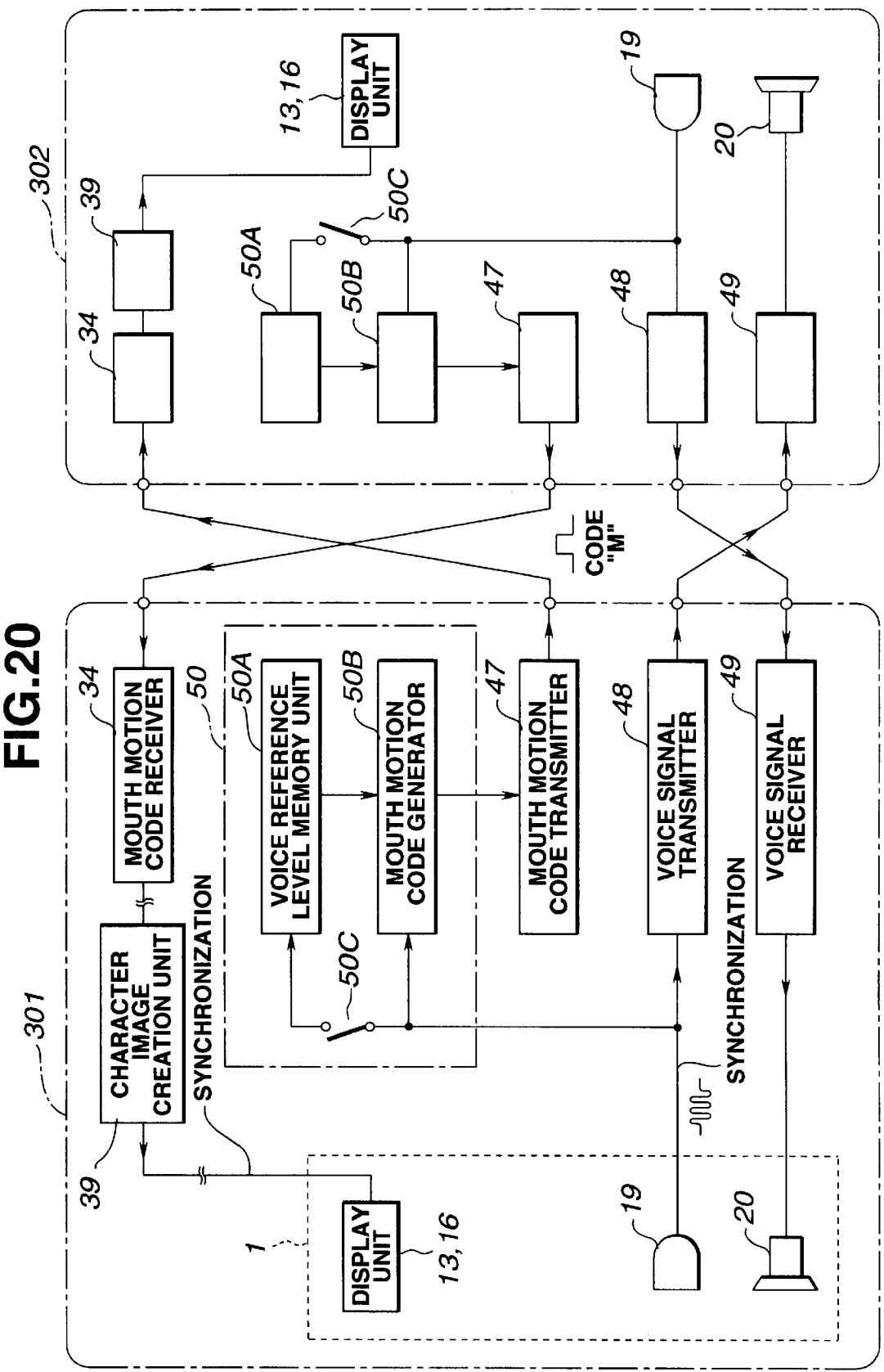
FIG. 20 is an explanatory drawing showing a voice detection mechanism and its peripheral part in the image and voice communication system of the first embodiment.

FIG. 20 is an explanatory drawing showing the voice detection mechanism and its peripheral elements. The same reference numerals are assigned to the same components as those shown in FIGS. 3 and 4. Furthermore, numerals 301 and 302 are designations for both the device on the sending side and the device on the receiving side, as the components in the two devices are equivalent.

In the device 301 on the sending side, a voice signal from the microphone 19 is sent to the mouth motion code transform unit 50 in the preparatory phase before communication to determine the initial setting data. On the other hand, in a dialog phase, a voice signal collected with the microphone 19 is sent to the voice signal transmitter 48 and is transmitted to the device 302 on the receiving side while user's mouth motion in the dialog is detected and the corresponding information is sent to the mouth motion code transform unit 50 of the picture creation box 2.

The mouth motion code transform unit 50, as shown in the figure, comprises a voice reference level memory unit 50A, a mouth motion code generator 50B, a switch 50C for controlling (ON/OFF) the voice reference level memory unit 50A. The voice reference level memory unit 50A operates only when the switch 50C is ON, and the switch 50C turns ON only for the preparatory phase before communication when a voice reference level is set.

Figure 10:
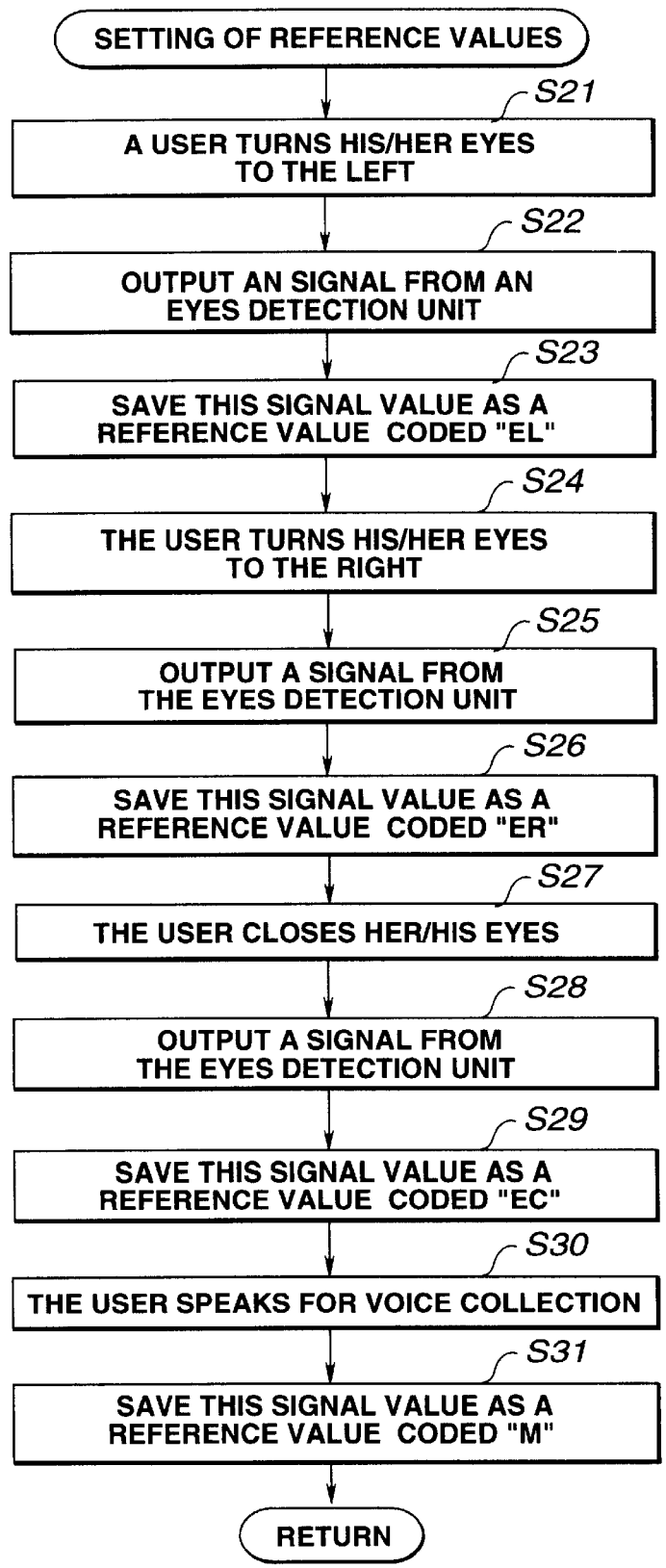
FIG. 10 is a flow chart showing setting work of reference values that are the transmit reference of predetermined codes according to the predetermined processing performed for the fundamental character image of the speaker in the sending side, in the image and voice communication system of the first embodiment.

Referring to FIG. 10, when setting the voice reference level, the switch 50C is set to ON, and the user (the speaker on the sending side) vocalizes (step S30) so that a sound level of the user's voice is stored in the voice reference level memory unit 50A (a voice detection unit) as the reference value for a code "M" (step S31). The process then returns to the main routine.

Returning to FIG. 8, when the setting of the reference values is completed, the speaker on the sending side confirms the fundamental character image and the reference values (step S5) and, if necessary, adjusts them until the speaker obtains the desired character image and change levels by repeating any or all of steps S1 to S4.

The discussions above have described the actions in the preparatory phase before communication using the image and voice communication system of the first preferred embodiment. Specifically, the creation of character data representing the character images and the like of the speaker on the sending side have been described.

Next, actions taken during the communication process will be described.

In the image and voice communication system of the first preferred embodiment, a predetermined protocol performs on initial negotiation upon start of the communication process, and subsequently the following data transfer is performed as an initial communication phase.

The fundamental character image data of the speaker on the sending side is transferred from the device on the sending side to the device on the receiving side and is stored in a memory unit of the device on the receiving side.

In addition, changed character image data representing countenance changes corresponding to the predetermined command signal code is transferred from the device on the sending side to the device on the receiving side and is stored in the memory unit of the device on the receiving side.

Further, when the data transfer in the initial communication phase is completed, the communication process moves to the next phase, whereupon the following operation is performed.

First, the device on the sending side detects the eye and mouth motions of the speaker on the sending side at a predetermined timing.

Next, the device on the sending side serially transmits predetermined command signal codes to the device on the receiving side, in accordance with the detection of eye and mouth motions of the speaker on the sending side and with the threshold values.

Thus, the device on the sending side detects the head motion of the speaker on the sending side and serially transmits this motion detection to the device on the receiving side. Furthermore, the transfer of the head motion code is synchronized with the transfer of the predetermined command signal codes.

The device on the sending side collects the voice signal of the speaker on the sending side at the predetermined timing and transmits the voice signal serially to the device in the receiving side. As with the head motion codes, the voice signal is transmitted in synchronization with the transmission of the predetermined command signal codes.

Meanwhile, the device on the receiving side receives the predetermined command signal codes corresponding to the eyes and mouth motions of the speaker on the sending side which was sent serially (substantially in real time) from the device on the sending side.

In addition, the device on the receiving side receives the head motion code and the voice signal of the speaker on the sending side which was sent serially (substantially in real time) from the device on the sending side.

Upon reception of the above, the device on the receiving side retrieves and reads the character image data for the eye and mouth motions or the changed character image data corresponding to the command signal codes from the memory unit.

Further, the device on the receiving side displays in the display unit the character image of the speaker on the sending side substantially in real time, based on the read character image data or the received head motion code.

Also, the device on the receiving side plays back the voice of the speaker on the sending side in real time based on the received voice signal.

Hereinafter, the operation of the image and voice communication system of the first preferred embodiment during the communication phase will be described with reference to FIGS. 21 to 32. In these figures, one user is referred to as "A" and another user is referred to as "B", and devices mounted by the user "A" and the user "B" are referred to as the device on side "A" and the device on side "B", respectively.

Figure 21:
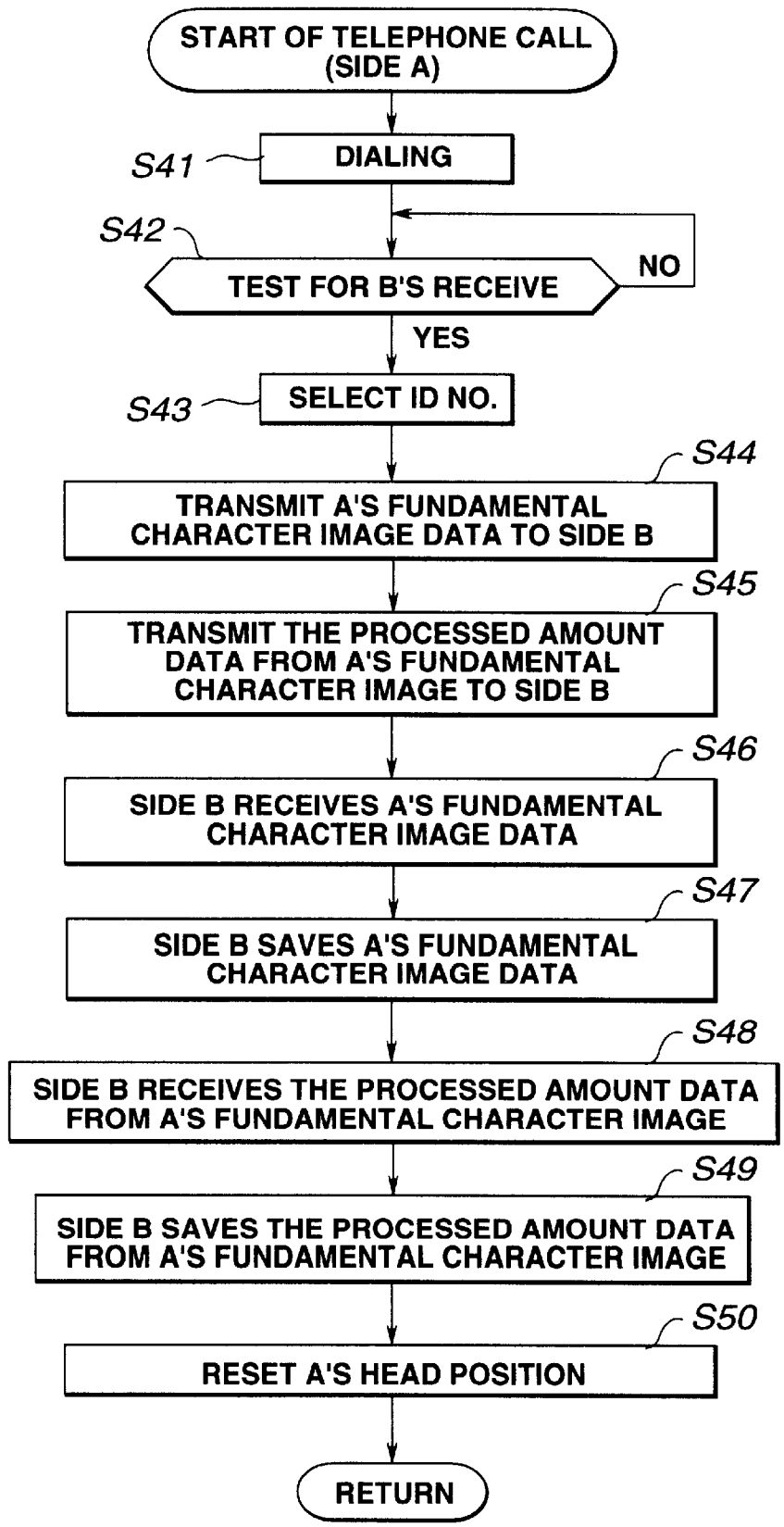
FIG. 21 is a flow chart showing actions of a speaker "A" in an initial communication phase after communication start in the image and voice communication system of the first embodiment.
Figure 22:
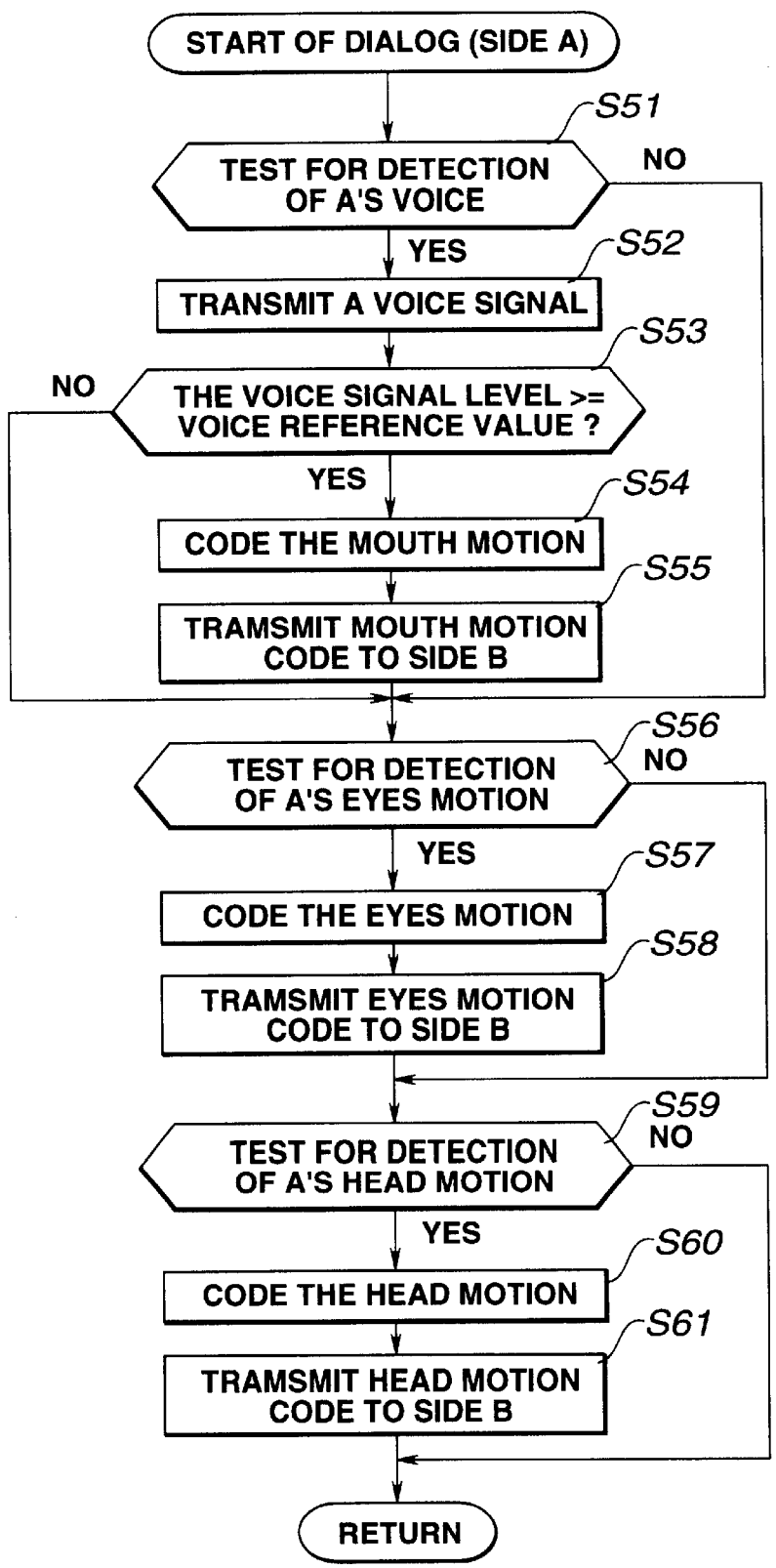
FIG. 22 is a flow chart showing transmitting actions of the speaker "A" in a dialog phase after communication start in the image and voice communication system of the first embodiment.
Figure 23:
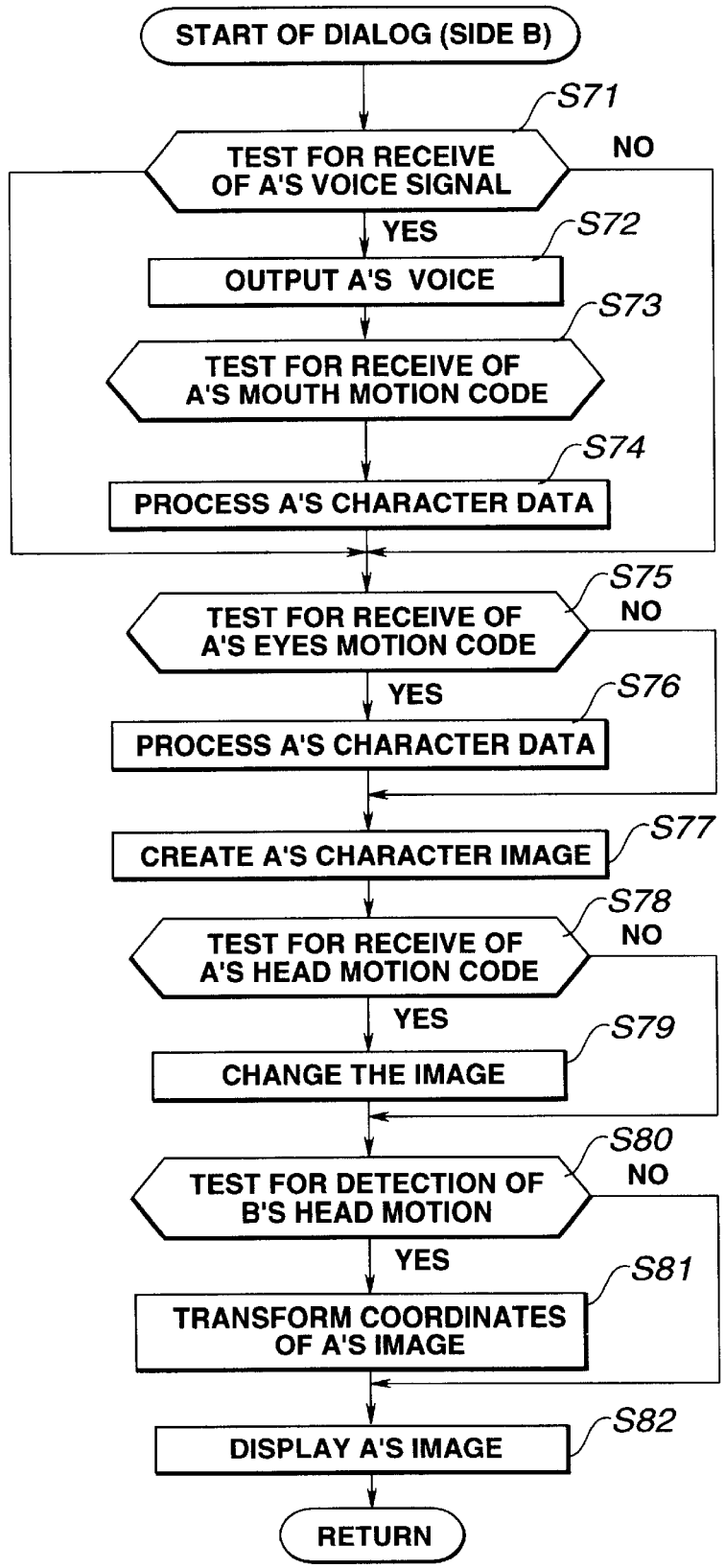
FIG. 23 is a flow chart showing actions of another speaker "B" in a dialog phase after communication start in the image and voice communication system of the first embodiment.

FIGS. 21 to 23 are flow charts showing actions taken after the start of communication through the image and voice communication system of the present embodiment. FIG. 21 shows actions of the device on side "A" in the initial communication phase, FIG. 22 shows actions of the device on side "A" in the dialog (transmission) phase, and FIG. 23 shows actions of the device on side "B" in the dialog (reception) phase.

As shown in FIG. 21, when a speaker "A" desires to communicate with an optional speaker "B", the speaker "A" first mounts the HMD 1 onto his/her head to obtain a telephonic dial tone and dials a phone number for the speaker "B" as with a typical telephone (step S41). In the present invention, the dialing may be performed with the dialing buttons 62 located on the controller pad 3.

After speaker "B" answers the call by similarly picking up the telephone line, it becomes possible for speaker "A" to talk with the mate speaker "B". That is, when the device on side "B" becomes ready for reception (step S42), the user "A" selects, for example, an ID number for identification of the mate speaker and identifies the mate speaker (step S43). This operation is performed with the controller pad 3.

Once identification is established, the device on side "A" transmits to speaker "B" through the character data transmitter 31 (see FIG. 4) various types of character data, including the data of the fundamental character image and the data representing the processed amounts (change amounts) of the character images created as described above. Thus, the fundamental character image data of speaker "B" is sent from the device on side "A" to the device on side "B" (step S44). Next, the processed amounts of countenance changes from the fundamental character image corresponding to the predetermined command signal codes are sent from the device on side "A" to the device on side "B" (step S45).

Subsequently, the device on side "A" receives the fundamental character image data of the speaker "B", which is transmitted from the device on side "B" with a character data receiver 32 (step S46) and stores the data in a character data memory 37 (step S47). Then, the device on side "A" receives with the character data receiver 32 (step S48) the processed amounts of countenance changes from the fundamental character images corresponding to the predetermined command signal codes and stores the data in the character data memory 37 (step S49).

Next, the device on side "A" resets the head position of the speaker "A" (step S50). This resets the position of the head motion sensor 11 in the HMD 1 mounted on the head of speaker "A". This reset operation, however, may be performed automatically when the execution of step S49 is completed, or, alternatively, may be performed manually by the user with a switch not shown.

In this manner, when the transfer of the various types of character data in the initial phase is completed, the communication process moves to the actual dialog phase.

As shown in FIG. 22, the speaker "A" first tests for the voice detection of the speaker "A" through the device on side "A" (step S51). This voice detection is performed by detecting the voice of the speaker "A" with the microphone 19 and the voice signal transmitter 48. After voice detection, the speaker "A" transmits a voice signal from the voice signal transmitter 48 (step S52).

The voice of the speaker "A" captured with the microphone 19 is inputted to the mouth motion code generator 50B (see FIG. 20). At the same time, the generator 50B judges whether a level of the voice reaches the voice reference level set in the voice reference level memory unit 50A beforehand (step S53). If the level is equal to or more than the voice reference level, the device on side "A" transforms the mouth motion into a code "M" with the mouth motion code generator 50B in the mouth motion code transform unit 50 (step S54). Further, the device on side "A" transmits the code "M" to the device on side "B" from the mouth motion code transmitter 47 (step S55), and the process goes to step S56.

If the voice of the speaker "A" is not detected at step S51, or if the detected voice does not meet the reference value at step S53, the process goes to step S56.

At step S56, the eye motion of the speaker "A" is detected. Thus, the device on side "A" detects the eye motion of the speaker "A" with the right eye detection unit 12 and the left eye detection unit 15. If the eye motion meets the reference values set beforehand at steps S23, S26, and S29 (see FIG. 10), the device on side "A" transforms the eye motion into the predetermined codes ("EL", "ER", and "EC") with the eye motion code transform unit 51 (see FIG. 4) (step S57). Further, the device on side "A" transmits the codes to the device on side "B" with the eye motion code transmitter 45 (step S58), and the process goes to step S59.

If the eye motion of the speaker "A" is not detected at step S56, that is, if eye motion does not meet the reference values, the process goes to step S59.

At step S59, the head motion of the speaker "A" is detected. That is, the device on side "A" detects the head motion of the speaker "A" with the head motion sensor 11 in the HMD 1. If a head motion is detected, the device on side "A" transforms the head motion into a predetermined code with the head motion code transform unit 52 (step S60) and transmits the code to the device on side "B" with the head motion code transmitter 46 (step S61).

Here, detection of the head motion and processing at the time the motion is detected will be described with reference to FIGS. 24 and 25.

Figure 24:
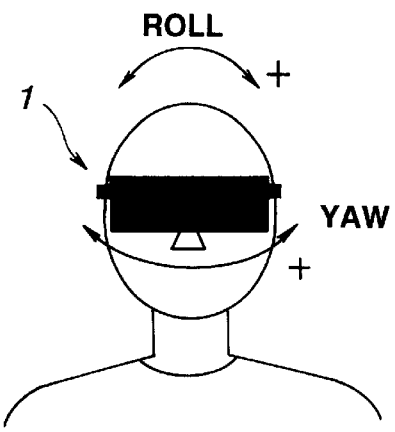
FIG. 24 is a front view of a user mounting an HMD in the image and voice communication system of the first embodiment.
Figure 25:
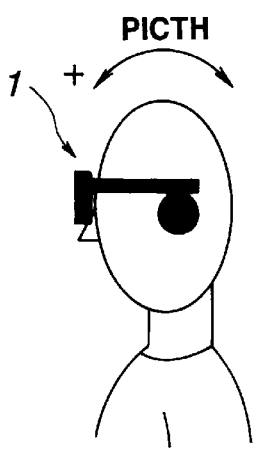
FIG. 25 is a side view of the user mounting the HMD in the image and voice communication system of the first embodiment.

FIG. 24 is a front view of a user having an HMD mounted thereon and using the image and voice communication system of the present embodiment, and FIG. 25 is a side view of the user having the HMD mounted thereon and using the image and voice communication system of the first embodiment.

Any movement of a user's head is generally measurable as a combination of motions in three directions represented by roll and yaw as shown in FIG. 24, and by pitch as shown in FIG. 25. The image and voice communication system of the present embodiment detects a user's head motion in this manner with the head motion sensor 11. As described above, when dialog is started, the position of the head motion sensor 11 is reset during the initial phase of the communication process (see step S50 shown in FIG. 21). Therefore, it is possible to capture the user's head motion by measuring the amount of displacement of the head motion sensor 11 from the reset reference position.

During the dialog, the image and voice communication system of the present embodiment continuously detects the displacement of the head motion sensor 11 and generates a predetermined code with the head motion code transform unit 52 in accordance with the detected motion. The image and voice communication system then sends the code to the speaker on the receiving side in synchronization with the transmission of the eye and mouth motion codes (codes corresponding to command signal codes).

As for the predetermined codes corresponding to the head motion, three types of codes corresponding to the motion in the roll, yaw, and pitch directions are provided. Hence, if the head motion code transform unit 52 receives the detection result of the head motion sensor 11 and judges that user's head moves to the roll, yaw, pitch, or a composite direction, the unit 52 transforms the head motion into any one or combination of the three types of codes and sends the result to the head motion code transmitter 46.

The actions of speaker "A" in transmitting data during the communication process have been described above with reference to FIGS. 21 and 22. Next, the actions of speaker "B" in receiving the data transmitted from speaker "A" during the dialog will be described below with reference to FIG. 23.

FIG. 23 is a flow chart showing the actions of the device on side "B" in the reception mode of the dialog.

When the dialog is started, the device on side "B" determines whether a voice signal has been received from the device on side "A" (step S71). If a voice signal is transmitted from the voice signal transmitter 48 of the device 301 on side "A" (see FIG. 20), the signal is received by a voice signal receiver 49 of the device 302 on side "B". Therefore, if the voice signal is received at step S71, the voice of the speaker on side "A" is played back with the speakers 20A and 20B (step S72).

After this, the device on side "B" determines whether the mouth motion code receiver 34 (see FIGS. 4 and 20) of the device on side "B" has received a predetermined mouth motion code sent from the mouth motion code transmitter 47 of the device on side "A" (step S73). If a code is received, the character data process unit 38 (see FIG. 4) processes the data of the character image according to the code (step S74), and the process goes to step S75.

In the event that no voice signal is received from the device on side "A" at step S71, and no mouth motion code is received at step S73 (including the case in which, although a voice signal is detected by the device on side "A", its voice level is lower than the predetermined reference level, and hence, a mouth motion code is not generated by the device on side "A"), the process goes to step S75.

At step S75, the device on side "B" determines whether the eye motions code receiver 33 of the device on side "B" has received a predetermined eye motion code sent from the eye motion code transmitter 45 of the device on side "A". If a code is received, the character data process unit 38 (see FIG. 4) processes the data of the character image according to the code (step S76), and the process goes to step S77. If, however, no eye motion code is received at step S75, the process goes to step S77.

At step S77, the device on side "B" creates the character image of the speaker on side "A" with the character image creation unit 39. At this time, a character image of the speaker on side "A", as shown in FIGS. 11 to 14, is displayed on the monitor screen of the HMD 1 of the speaker on side "B", with the character image also depicting the countenance changes including the eye and mouth motions of the speaker on side "A". Additionally, the eye and mouth motions of the speaker on side "A" are reflected substantially in real time in the displayed character image.

After this, the device on side "B" determines at step S78 whether the head motion code receiver 35 of the device on side "B" has received a predetermined head motion code sent from the head motion code transmitter 46 of the device on side "A". As described above, there are three types of head motion codes corresponding to the motion in the roll, yaw, and pitch directions.

If at least any one of the codes is received at step S78, the device on side "B" calculates the amount of change from the original image with the image change amount calculation unit 40 based on the received code. Then, the device on side "B" causes the image change unit 41 to change the character image of the speaker on side "A" created with the character image creation unit 39 at step S77 (step S79), and the process goes to step S80. If no code is received at step S78, the process goes to step S80.

Thus, the device on side "B" changes the character image of the speaker "A" created with the character image creation unit 39, in accordance with the head motion of the speaker on side "A" received by the head motion code receiver 35 of the device on side "B".

Here, concrete examples of this image change will be described.

Figure 26:
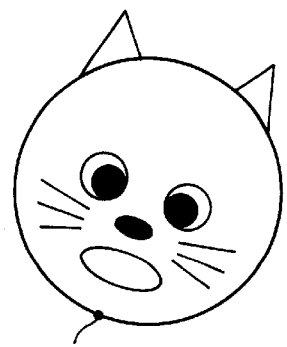
FIG. 26 is a drawing showing an example of an image change at the time when a device on the side "B" receives a head motion code from a device on the side "A" in the image and voice communication system of the first embodiment, and in particular, this shows an example of an image change at the time of receiving a code corresponding to the head motion of the speaker "A" in a roll direction.
Figure 27:
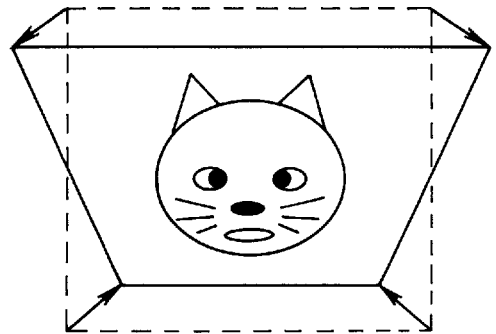
FIG. 27 is a drawing showing an example of an image change at the time when the device on the side "B" receives a head motion code from the device on the side "A" in the image and voice communication system of the first embodiment, and in particular, this shows an example of an image change at the time of receiving a code corresponding to the head motion of the speaker "A" in a yaw direction.
Figure 28:
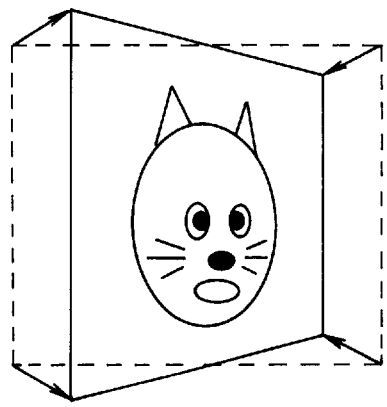
FIG. 28 is a drawing showing an example of an image change at the tie when the device in the side "B" receives a head motion code from the device in the side "A" in the image and voice communication system of the first embodiment, and in particular, this shows an example of an image change at the time of receiving a code corresponding to the head motion of the speaker "A" in a yaw direction.

FIGS. 26 to 28 are schematic diagrams showing examples of the image changes performed when the device on side "B" of the image and voice communication system of the present embodiment receives a head motion code from the device on side "A". FIG. 26 is a schematic diagram showing an example of an image change performed when the device on side "B" receives a code corresponding to a head motion of the speaker "A" in the roll direction. FIG. 27 is a schematic diagram showing an example of an image change performed when the device on side "B" receives a head motion code corresponding to a head motion of the speaker "A" in the pitch direction. Further, FIG. 28 is a schematic diagram showing an example of an image change performed when the device on side "B" receives a head motion code corresponding to a head motion of the speaker "A" in the yaw direction. The image changes shown in FIGS. 26–28 are based on the fundamental character image of speaker "A" as exemplified in FIG. 14.

If the device on side "B" receives a code corresponding to a head motion of the speaker "A" in the roll direction, a changed character image is displayed on the monitor screen of the HMD 1 mounted on speaker "B" by rotating the coordinates (to a degree corresponding to the plus or minus direction of the roll) about a predetermined point in the fundamental character image. In the example shown in FIG. 26, the lowest point of the character face is chosen to be the predetermined center of rotation. Thus, the changed character image displayed in the figure shows a roll in the plus direction.

When the device on side "B" receives a code corresponding to a head motion in the pitch direction, a changed character image is displayed on the monitor screen of the HMD 1 mounted on speaker "B" by performing the well-known trapezoidal distortion processing (vertical distortion) about a central horizontal axis of the fundamental character image as shown in FIG. 27. Thus, the changed character image depicted in the figure shows an example of a head motion in a plus pitch direction.

When the device on side "B" receives a code corresponding to a head motion in the yaw direction, a changed character image is displayed on the monitor screen of the HMD 1 mounted on speaker "B" by performing the trapezoidal distortion processing (horizontal distortion) about a central vertical axis of the fundamental character image as shown in FIG. 28. Thus, the changed character image depicted in the figure shows an example of a head motion in a plus yaw direction.

Furthermore, if the device on side "B" receives a plurality of codes among the three types of head motion codes within a predetermined period, the device on side "B" displays a composite image representing the image changes shown in FIGS. 26 to 28.

Returning to FIG. 23, the device on side "B" detects the head motion of the speaker "B" herself/himself with the head motion sensor 11 (step S80). Then, when detecting the head motion of the speaker "B", the device on side "B" performs the coordinate transformation of the character image of the speaker "A", which is displayed on the monitor screen of the speaker "B" in accordance with the result from the coordinate transform unit 42 (step S81).

A detailed explanation of the coordinate transformation will be described.

The coordinate transform unit 42 determines the transformed vectors of the character image of the speaker "A" which is displayed on the monitor screen of the speaker "B" in a corresponding position relative to the head position of the speaker "B". In this embodiment, the head position of the speaker "B" is also reset in an operation similar to the reset operation of the head position of the speaker "A" (the position of head motion sensor 11) at step S50. Thus, the head position of the speaker at the time the reset operation is performed is designated as the reference position.

Figure 29:
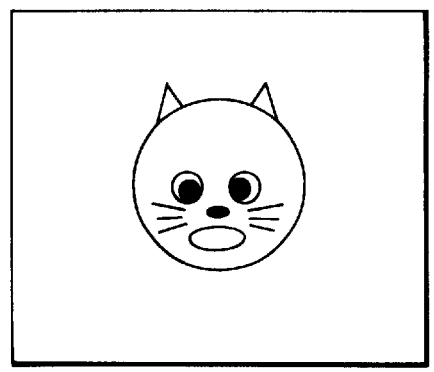
FIG. 29 is an explanatory drawing according to coordinate transformation in the image and voice communication system of the first embodiment, and in particular, this is a drawing showing an example of displaying a character image of the speaker "A" on a monitor screen of the speaker "B" at the time when a head position of the speaker "B" is at the reference position.

Accordingly, the character image of the speaker "A" is positioned nearly at the center of the monitor screen of speaker "B" when the head position of the speaker "B" is at the reference position, as appears in FIG. 29.

Figure 30:
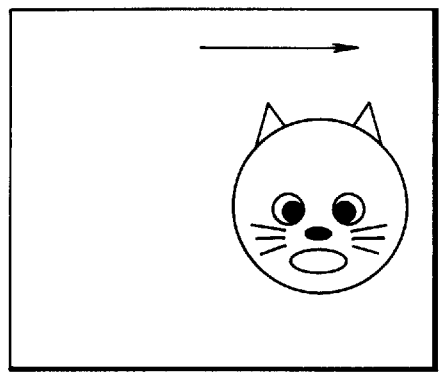
FIG. 30 is an explanatory drawing according to coordinate transformation in the image and voice communication system of the first embodiment, and in particular, this is a drawing showing an example of displaying a character image of the speaker "A" on the monitor screen of the speaker "B" at the time when a head position of the speaker "B" moves from the reference position to the yaw direction.

If, however, the head of the speaker "B" is moved in the plus yaw direction (the rotation to the left of the speaker "B" being defined as the plus direction), as shown in FIG. 24), the character image of the speaker "A" is displayed on the monitor screen of speaker "B" toward the right of the screen as shown in FIG. 30.

Figure 31:
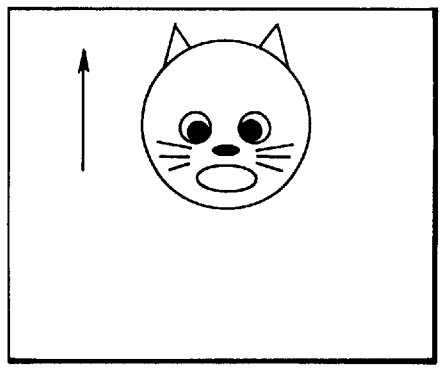
FIG. 31 is an explanatory drawing according to coordinate transformation in the image and voice communication system of the first embodiment, and in particular, this is a drawing showing an example of displaying a character image of the speaker "A" on the monitor screen of the speaker "B" at the time when a head position of the speaker "B" moves from the reference position to the pitch direction.

Similarly, if the head of the speaker "B" is moved in the plus pitch direction (the rotation downward being defined as the plus direction, as shown in FIG. 25), the character image of the speaker "A" is displayed on the monitor screen of speaker "B" toward the top of the screen as shown in FIG. 31.

Figure 32:
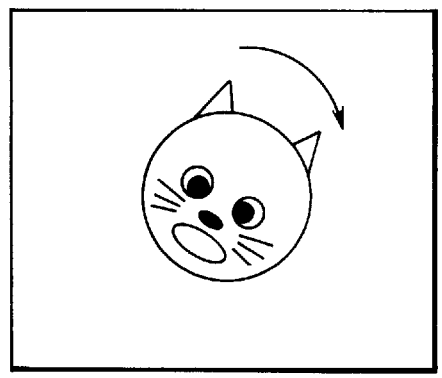
FIG. 32 is an explanatory drawing according to coordinate transformation in the image and voice communication system of the first embodiment, and in particular, this is a drawing showing an example of displaying a character image of the speaker "A" on the monitor screen of the speaker "B" at the time when a head position of the speaker "B" moves from the reference position to the roll direction.

Finally, if the head of the speaker "B" is moved in the plus roll direction, (the counterclockwise rotation from the viewpoint of the speaker "B" being defined as the plus direction, as shown in FIG. 24), the character image of the speaker "A" is displayed on the monitor screen of speaker "B" as being rotated clockwise from the viewpoint of speaker "B", as shown in FIG. 32.

Thus, using the collected teachings presented heretofore, the character image of the speaker "A" is processed, changed, and transformed on the basis of the respective data sent from the device on sided "A" and is displayed on the monitor screen of the HMD 1 mounted by the speaker "B" (step S82).

The image and voice communication system of the first embodiment of the present invention provides at least the advantages listed below.

(1) It is possible to provide a videotape system through which users can enjoy dialog with character images which do not necessarily resemble their own faces. Thus, the above-mentioned character images can be imaginatively created and used by selecting images among predetermined images.

(2) It is possible to provide a videophone system through which a user can transmit the motion of the user's face and change in countenance substantially in real time to the communication mate without extensive effort and being simple in construction. Thus, the data representing the user's face motions and countenance changes are simple and can be transferred at high speed.

(3) It is possible to provide a videophone system through which a user can talk without self-consciousness. Thus, all the user has to do is to mount an HMD.

(4) It is possible to provide a videophone system by which a user can talk without being forced to take a predetermined posture. That is, the user can talk without facing a special delay or a special camera.

(5) It is possible to provide a videophone system that a user can easily use at the user's house without troublesome preparation before the start of communication. Thus, the user can start the dialog without attaching markers for countenance detection.

Next, an image and voice communication system of a second embodiment will be described.

The fundamental construction and actions of the second embodiment are similar to those of the first embodiment; hence only the features which are different will be referred to wherein discussion pertaining to similar features will be omitted.

In the image and voice communication system of the first embodiment, the image of another speaker "B", which is monitored by a speaker "A", is a character image of the speaker "B" that the speaker "B" controls with the device on side "B". However, this image and voice communication system of the second embodiment is characterized in that the image of the other speaker "B", which is monitored by the speaker "A", is a predetermined character image that was optionally set or stored beforehand with the device on side "A".

Thus, the character image of the speaker "B" that the speaker "A" sees on the monitor screen of the HMD 1 of the speaker "A" is the character image that the speaker "A" has set or stored beforehand. In this time, an image that the speaker "A" sets beforehand with the device on side "A" to be the character image of the speaker "B" may be used as the character image of the speaker "B", or an unspecific character image that the speaker "A" optionally selects and uses may be used.

In addition, the character image of the speaker "B" that the speaker "A" sees can be optionally switched and used during the dialog.

Furthermore, if the users can identify each other with ID numbers or the like at the start of the communication process it is also possible using the second embodiment of the present invention to select the mate's character image corresponding to the mate's ID number on a receiving side.

The image and voice communication system of the second embodiment provides the following further advantage in addition to the advantages identified in items (2) to (5) listed above with respect to the first embodiment.

(6) It is possible to optionally set or switch a character image of the dialog mate on the receiving side, and hence, to realize joyful dialog.

As described above, this invention can provide an image and voice communication system and a videophone transfer method which transfer speakers' face motions and countenance changes in real time using simple and low-cost devices without significant burdens to the users in terms of preparation time and effort.

Although the present invention has been described in connection with the preferred embodiments thereof, many other variations and modifications will now become apparent to those skilled in the art without departing from the spirit and scope of the invention. It is preferred, therefore, that the present invention be limited not by the specific disclosure herein, but only by the appended claims.

What is claimed is:

1. A communication unit for image and voice communication in a videophone communication system between at least two correspondents, the communication unit comprising:

an image display element;

a voice output element;

a character image storing element capable of storing character image data to be used in displaying a character image on the image display element;

a change command receiving element for receiving a command signal for changing the character image data;

a character image changing element for changing the character image data according to the command signal;

a character image setting element for enabling each correspondent using a respective communication unit to set a desired character image to represent himself or herself and providing the character image to each of the other correspondents, such that each correspondent can associate each of the other correspondents with a respective representative character image, whereby the character image of each correspondent can be displayed by the image display elements of the communication units of the other correspondents; and a graphic character selection element for identifying other correspondents upon reception of signals transmitted by the other correspondents during the communication process, and for displaying the character images representing the identified correspondents on the image display element.

2. A communication unit for image and voice communication in a videophone communication system between at least two correspondents, the communication unit comprising:

an image display element;

a voice output element;

a character image storing element capable of storing character image data to be used in displaying a character image on the image display element;

an eye motion sensor for generating output signals representing eye motions of a first correspondent using the communication unit;

a head motion sensor for generating output signals representing head motions of the first correspondent using the communication unit;

a voice detection element for generating output signals representing verbal communication by the first correspondent using the communication unit;

a head mountable device, wherein the eye motion sensor, the head motion detector, and the voice detection element are located in the head mountable device;

a transmission element for transmitting a command signal in response to output signals from the eye motion detector, the head motion sensor, and the voice detection element;

a change command receiving element for receiving a command signal from another communication unit used by a second correspondent; and a character image changing element for changing the character image data in response to the command signal received by the change command receiving element.

3. A communication unit according to claim 2, further comprising:

an execution determiner for allowing the transmission element to transmit the command signal only when a change level of the detected output meets a predetermined execution condition.

4. A communication unit according to claim 2, wherein an output signal of the head motion sensor controls a movement of a character image corresponding to the first correspondent and also controls a display position of a character image corresponding to the second correspondent on the image display element of the communication unit used by the first correspondent as if each character image were fixed in real space.

5. A communication unit according to claim 2, wherein the character image to be displayed on the image display element of the communication unit used by the first correspondent represents the second correspondent using another communication unit; wherein the command signal is received in the communication unit substantially in real time with eye motion, head motion and verbal communication by the second correspondent; and wherein the system is capable of displaying a changed character image on the image display element according to the received command signal substantially in real time with the eye motion, head motion and verbal communication by the second correspondent.

6. A communication unit according to claim 5, wherein an output signal of the head motion sensor controls a movement of a character image corresponding to the first correspondent and also controls a display position of a character image corresponding to the second correspondent on the image display element of the communication unit used by the first correspondent as if each character image were fixed in real space.

7. A method for videophone communication between at least two correspondents comprising serially executing the steps of:

setting and storing a desired self-representative character image by each correspondent;

exchanging character image representations between each of the correspondents;

storing character image representations received from other correspondents;

displaying, by each correspondent, the character image of at least one other correspondent;

designating at least one feature of the self-representative character image by each correspondent to be changeable;

identifying at least one change mode for each feature designated to be changeable;

specifying an effective condition under which each change mode will be executed;

detecting, after the start of communication, a change by a correspondent corresponding to a particular change mode of a part of the character image determined to be changeable;

evaluating an amount of the detected change and whether the detected change satisfies the specified change mode condition;

transmitting a change command to effectuate a change to the corresponding changeable part whenever the detected change satisfies the specified change mode condition for that part; and transmitting a voice signal.

8. A method for videophone communication according to claim 7, further comprising serially executing the steps of:

receiving the transmitted change command;

changing the corresponding changeable part of the character image by the evaluated amount; and displaying the changed image.

* * * * *